US012387082B2

(12) United States Patent
Datta et al.

(10) Patent No.: US 12,387,082 B2
(45) Date of Patent: Aug. 12, 2025

(54) SCHEDULER FOR MAPPING NEURAL NETWORKS ONTO AN ARRAY OF NEURAL CORES IN AN INFERENCE PROCESSING UNIT

(71) Applicant: INTERNATIONAL BUSINESS MACHINES CORPORATION, Armonk, NY (US)

(72) Inventors: Pallab Datta, San Jose, CA (US); Andrew S. Cassidy, San Jose, CA (US); Myron D. Flickner, San Jose, CA (US); Hartmut Penner, San Jose, CA (US); Rathinakumar Appuswamy, San Jose, CA (US); Jun Sawada, Austin, TX (US); John V. Arthur, Mountain View, CA (US); Dharmendra S. Modha, San Jose, CA (US); Steven K. Esser, San Jose, CA (US); Brian Taba, Cupertino, CA (US); Jennifer Klamo, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1080 days.

(21) Appl. No.: 16/051,034

(22) Filed: Jul. 31, 2018

(65) Prior Publication Data

US 2020/0042856 A1 Feb. 6, 2020

(51) Int. Cl.
*G06N 3/04* (2023.01)
*G06F 9/30* (2018.01)
(Continued)

(52) U.S. Cl.
CPC ........... *G06N 3/04* (2013.01); *G06F 9/30076* (2013.01); *G06F 9/4881* (2013.01); *G06N 3/063* (2013.01)

(58) Field of Classification Search
CPC ........ G06N 3/04; G06N 3/063; G06N 3/0445; G06N 3/0454; G06N 5/022; G06F 9/30076; G06F 9/4881
See application file for complete search history.

(56) References Cited

U.S. PATENT DOCUMENTS

| 5,714,768 A | 2/1998 | Ovshinsky et al. |
| 6,389,404 B1 | 5/2002 | Carson et al. |

(Continued)

FOREIGN PATENT DOCUMENTS

| JP | 2010/092483 A | 4/2010 |
| JP | 2015/517712 A | 6/2015 |

(Continued)

OTHER PUBLICATIONS

US 9,846,837 B1, 12/2017, Narayanaswami et al. (withdrawn)
(Continued)

*Primary Examiner* — Vincent Gonzales
*Assistant Examiner* — Sidney Vincent Bostwick
(74) *Attorney, Agent, or Firm* — Erik A. Huestis; Katherine L. Baker; Foley Hoag LLP

(57) ABSTRACT

Mapping of neural network layers to physical neural cores is provided. In various embodiments, a neural network description describing a plurality of neural network layers is read. Each of the plurality of neural network layers has an associated weight tensor, input tensor, and output tensor. A plurality of precedence relationships among the plurality of neural network layers is determined. The weight tensor, input tensor, and output tensor of each of the plurality of neural network layers are mapped onto an array of neural cores.

25 Claims, 25 Drawing Sheets

(51) Int. Cl.
G06F 9/48 (2006.01)
G06N 3/063 (2023.01)

(56) References Cited

U.S. PATENT DOCUMENTS

| | | | |
|---|---|---|---|
| 9,015,096 | B2 | 4/2015 | Hunzinger |
| 9,165,243 | B2 | 10/2015 | Yu et al. |
| 9,245,222 | B2 | 1/2016 | Modha |
| 9,424,284 | B2 | 8/2016 | Alvarez-Icaza Rivera et al. |
| 9,852,006 | B2 | 12/2017 | Akopyan et al. |
| 2005/0149936 | A1 | 7/2005 | Pilkington |
| 2008/0208372 | A1 | 8/2008 | Pannese |
| 2008/0235700 | A1 | 9/2008 | Iguchi |
| 2010/0268912 | A1 | 10/2010 | Conte et al. |
| 2012/0053948 | A1* | 3/2012 | Mustiere ............... H03M 7/30 341/87 |
| 2013/0073497 | A1 | 3/2013 | Akopyan et al. |
| 2015/0106314 | A1 | 4/2015 | Birdwell et al. |
| 2015/0324684 | A1 | 11/2015 | Alvarez-Icaza Rivera et al. |
| 2015/0324690 | A1* | 11/2015 | Chilimbi ............... G06N 3/063 706/27 |
| 2016/0098629 | A1 | 4/2016 | Lipasti et al. |
| 2016/0239074 | A1 | 8/2016 | Lee et al. |
| 2016/0247062 | A1 | 8/2016 | Amir et al. |
| 2017/0103311 | A1 | 4/2017 | Henry et al. |
| 2017/0169326 | A1 | 6/2017 | Diamos et al. |
| 2017/0236053 | A1 | 8/2017 | Lavigueur et al. |
| 2017/0316312 | A1* | 11/2017 | Goyal ............... G06N 3/0454 |
| 2017/0323198 | A1 | 11/2017 | Tan et al. |
| 2017/0344882 | A1 | 11/2017 | Ambrose et al. |
| 2017/0357935 | A1 | 12/2017 | Fabjanski et al. |
| 2018/0107766 | A1 | 4/2018 | Dumitrescu et al. |
| 2018/0174041 | A1 | 6/2018 | Imam et al. |
| 2018/0189648 | A1 | 7/2018 | Sengupta et al. |
| 2018/0197075 | A1* | 7/2018 | Modha ............... G06N 3/063 |
| 2018/0285727 | A1* | 10/2018 | Baum ............... G06F 30/27 |
| 2018/0307980 | A1* | 10/2018 | Barik ............... G06F 9/3851 |
| 2019/0235866 | A1* | 8/2019 | Das Sarma ......... G06F 9/30032 |
| 2019/0325295 | A1 | 10/2019 | Modha et al. |
| 2020/0026992 | A1* | 1/2020 | Zhang ............... G06N 3/084 |
| 2020/0201697 | A1* | 6/2020 | Torng ............... G06F 11/076 |

FOREIGN PATENT DOCUMENTS

| | | |
|---|---|---|
| JP | 2016/001417 A | 1/2016 |
| WO | 1993/014459 A1 | 7/1993 |

OTHER PUBLICATIONS

Daulani, Hitesh P., Radhakrishna Naik, and Pavan S. Wankhade. "Precedence Constraint Task Scheduling for Multicore Multikernel Architecture." IOSR Journal of Computer Engineering (IOSR-JCE) 16.4 (2014): 43-53. (Year: 2014).*
Sawada, Jun, et al. "Truenorth ecosystem for brain-inspired computing: scalable systems, software, and applications." SC'16: Proceedings of the International Conference for High Performance Computing, Networking, Storage and Analysis. IEEE, 2016. (Year: 2016).*
Campos, Pedro, et al. "XL-STaGe: A cross-layer scalable tool for graph generation, evaluation and implementation." 2016 International Conference on Embedded Computer Systems: Architectures, Modeling and Simulation (SAMOS). IEEE, 2016. (Year: 2016).*
Liu, Shaoli, et al. "Cambricon: An instruction set architecture for neural networks." 2016 ACM/IEEE 43rd Annual International Symposium on Computer Architecture (ISCA). IEEE, 2016. (Year: 2016).*
Peemen, Maurice, et al. "Memory-centric accelerator design for convolutional neural networks." 2013 IEEE 31st International Conference on Computer Design (ICCD). IEEE, 2013. (Year: 2013).*
Xin, Chen, et al. "COSY: An energy-efficient hardware architecture for deep convolutional neural networks based on systolic array." 2017 IEEE 23rd International Conference on Parallel and Distributed Systems (ICPADS). IEEE, 2017. (Year: 2017).*
Park, Jongse, et al. "Scale-out acceleration for machine learning." Proceedings of the 50th Annual IEEE/ACM International Symposium on Microarchitecture. 2017. (Year: 2017).*
Santara, Anirban, et al. "Faster learning of deep stacked autoencoders on multi-core systems using synchronized layer-wise pre-training." arXiv preprint arXiv:1603.02836 (2016). (Year: 2016).*
Chillet et al.; "Real-Time Scheduling on Heterogeneous System-On-Chip ArchitecturesUsing an Optimized Artificial Neural Network", Journal of Systems Architecture 57 (2011) 340-353.
Ghosh et al.; "Mapping Neural Networks Onto Message-Passing Multicomputers", Journal of Parallel and Distributed Computing 6,29 1-330 (1989).
Bengio et al.; "Scheduled Sampling for Sequence Prediction With Recurrent Neural Networks", (Sep. 2015) Google Research.
Hasan et al.; "High Throughput Neural Network Based Embedded Streaming Multicore Processors.".
Akopyan et al., "TrueNorth: Design and Tool Flow of a 65 mW 1 Million Neuron Programmable Neurosynaptic Chip," IEEE Transactions on Computer-Aided Design of Integrated Circuit and Systems, 34(10): 1537-1557 (2015).
Amir et al: "Cognitive computing programming paradigm: A Corelet Languagefor composing networks of neurosynaptic cores," The 2013 International Joint Conference on Neural Networks (IJCNN), IEEE, Aug. 4, 2013.
Braga et al., "VANNGen: A Flexible CAD Tool for Hardware Implementation of Artificial Neural Networks," Proc of the 2005 Intl Conf on Reconfigurable Computing and FPGAs (ReConFig 2005), IEEE Computer Society, 2005.
EPO Oral Proceedings Written Submissions Letter filed for EP Application No. 17825508.9 submitted Feb. 1, 2022.
Filipp et al: "TrueNorth: Design and Tool Flow of a 65 mW 1 Million Neuron Programmable Neurosynaptic Chip", IEEE Transactions on Computer Aided Design of Integrated Circuits and Systems, IEEE Service Center, Piscataway, NJ, US, vol. 34, No. 10, Oct. 1, 2015.
International Search Report and Written Opinion for PCT/EP2017/083881 mailed Mar. 28, 2018.
JP Notice of Reasons for Refusal for JP Application No. 2019-529248 dated Jul. 26, 2021.
Preissl et al: "Compass: A scalable simulator for an architecture for cognitive computing", High Performance Computing, Networking, Storage and Analysis (SC), 2012 International Conference for, IEEE, Nov. 10, 2012.
Saifullah et al: "Parallel Real-Time Scheduling of DAGs", IEEE Transactions on Parallel and Distributed Systems, IEEE Service Center, Los Alamitos, CA, US, vol. 25, No. 12, Dec. 1, 2014.

* cited by examiner

FIG. 17

SCHEDULER FOR MAPPING NEURAL NETWORKS ONTO AN ARRAY OF NEURAL CORES IN AN INFERENCE PROCESSING UNIT

BACKGROUND

Embodiments of the present disclosure relate to mapping neural network layers to physical neural cores, and more specifically, to a scheduler for mapping neural networks onto an array of neural cores in an inference processing unit.

BRIEF SUMMARY

According to embodiments of the present disclosure, methods of and computer program products for mapping neural network layers to physical neural cores are provided. In various embodiments, a neural network description describing a plurality of neural network layers is read. Each of the plurality of neural network layers has an associated weight tensor, input tensor, and output tensor. A plurality of precedence relationships among the plurality of neural network layers is determined. The weight tensor, input tensor, and output tensor of each of the plurality of neural network layers are mapped onto an array of neural cores.

BRIEF DESCRIPTION OF THE SEVERAL VIEWS OF THE DRAWINGS

FIG. 17 illustrates an exemplary data delivery and computation schedule according to embodiments of the present disclosure.

DETAILED DESCRIPTION

Figure 1:
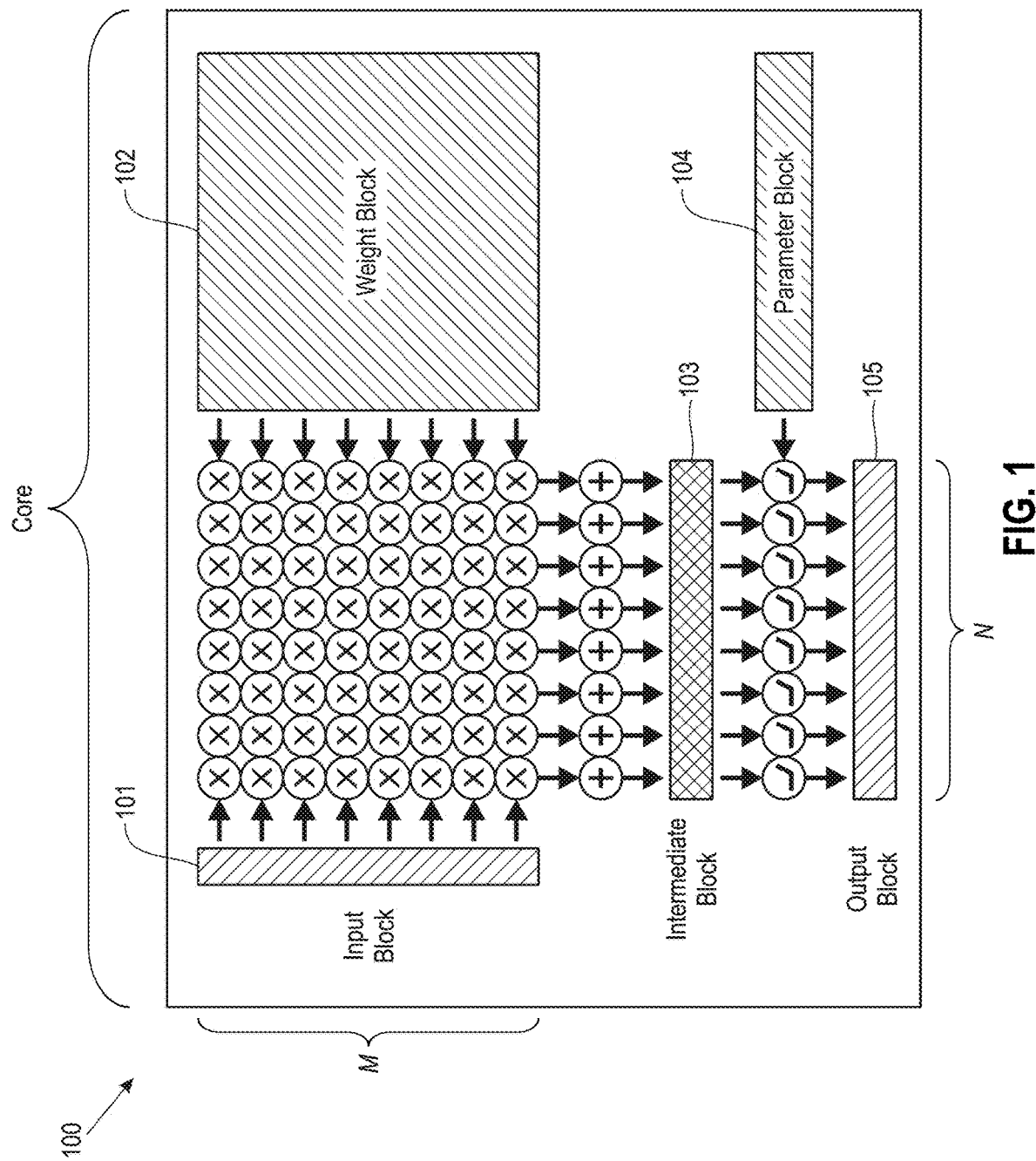
FIG. 1 illustrates a neural core according to embodiments of the present disclosure.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a parameter tensor V, weight tensor W, input data tensor X, output data tensor Y, and intermediate data tensor Z. The parameter tensor contains all of the parameters that control neuron activation functions a in the layer. The weight tensor contains all of the weights that connect inputs to the layer. The input data tensor contains all of the data that the layer consumes as input. The output data tensor contains all of the data that the layer computes as output. The intermediate data tensor contains any data that the layer produces as intermediate computations, such as partial sums.

The data tensors (input, output, and intermediate) for a layer may be 3-dimensional, where the first two dimensions may be interpreted as encoding spatial location and the third dimension as encoding different features. For example, when a data tensor represents a color image, the first two dimensions encode vertical and horizontal coordinates within the image, and the third dimension encodes the color at each location. Every element of the input data tensor X can be connected to every neuron by a separate weight, so the weight tensor W generally has 6 dimensions, concatenating the 3 dimensions of the input data tensor (input row a, input column b, input feature c) with the 3 dimensions of the output data tensor (output row i, output column j, output feature k). The intermediate data tensor Z has the same shape as the output data tensor Y. The parameter tensor V concatenates the 3 output data tensor dimensions with an additional dimension o that indexes the parameters of the activation function σ.

An element of a layer's output data tensor Y can be computed as in Equation 1 where the neuron activation function σ is configured by the vector of activation function parameters V[i, j, k, :], and the weighted sum Z[i, j, k] can be computed as in Equation 2.

$$Y[i, j, k] = \sigma(V[i, j, k, :]; Z[i, j, k]) \quad \text{Equation 1}$$

$$Z[i, j, k] = \sum_{a=1}^{A}\sum_{b=1}^{B}\sum_{c=1}^{C} W[i, j, k, a, b, c] \cdot X[a, b, c] \quad \text{Equation 2}$$

For simplicity of notation, the weighted sum in Equation 2 may be referred to as the output, which is equivalent to using a linear activation function Y[i, j, k]=σ(Z[i, j, k])=Z[i, j, k], with the understanding that the same statements apply without loss of generality when a different activation function is used.

In various embodiments, computation of the output data tensor as described above is decomposed into smaller problems. Each problem may then be solved on one or more neural core, or on one or more core of a conventional multicore system in parallel.

With reference now to FIG. 1, a neural core according to embodiments of the present disclosure is depicted. A neural core 100 is a tileable computational unit that computes one block of an output tensor. A neural core 100 has M inputs and N outputs. In various embodiments, M=N. To compute an output tensor block, a neural core multiplies an M×1 input tensor block 101 with an M×N weight tensor block 102 and accumulates the products into weighted sums that are stored in a 1×N intermediate tensor block 103. A O×N parameter tensor block contains the O parameters that specify each of the N neuron activation functions that are applied to the intermediate tensor block 103 to produce a 1×N output tensor block 105.

Multiple neural cores may be tiled in a neural core array. In some embodiments, the array is 2-dimensional.

A neural network model is a set of constants that collectively specify the entire computation performed by a neural network, including the graph of connections between neurons as well as the weights and activation function parameters for every neuron. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

Figure 2:
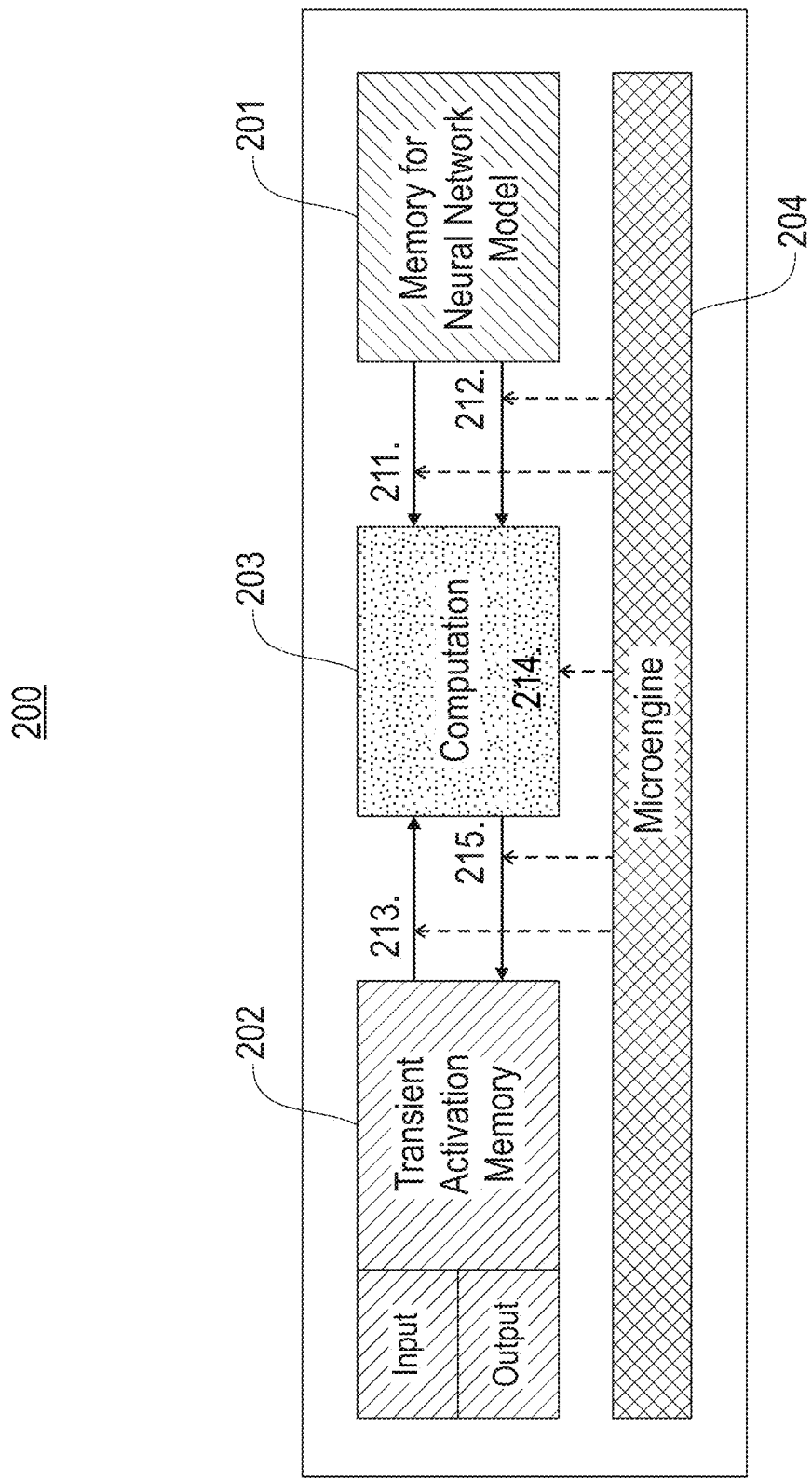
FIG. 2 illustrates an exemplary Inference Processing Unit (IPU) according to embodiments of the present disclosure.

Referring to FIG. 2, an exemplary Inference Processing Unit (IPU) is illustrated according to embodiments of the present disclosure. IPU 200 includes a memory 201 for the neural network model. As described above, the neural network model may include the synapse weights for a neural network to be computed. IPU 200 includes an activation memory 202, which may be transient. Activation memory 202 may be divided into input and output regions, and stores neuron activations for processing. IPU 200 includes a neural computation unit 203, which is loaded with a neural network model from model memory 201. Input activations are provided from activation memory 202 in advance of each computation step. Outputs from neural computation unit 203 are written back to activation memory 202 for processing on the same or another neural computation unit.

In various embodiments a microengine 204 is included in IPU 200. In such embodiments, all operations in the IPU are directed by the microengine. As set out below, central and/or distributed microengines may be provided in various embodiments. A global microengine may be referred to as a chip microengine, while a local microengine may be referred to as a core microengine or local controller. In various embodiments a microengine comprises one or more microengines, microcontrollers, state machines, CPUs, or other controllers.

Figure 3:
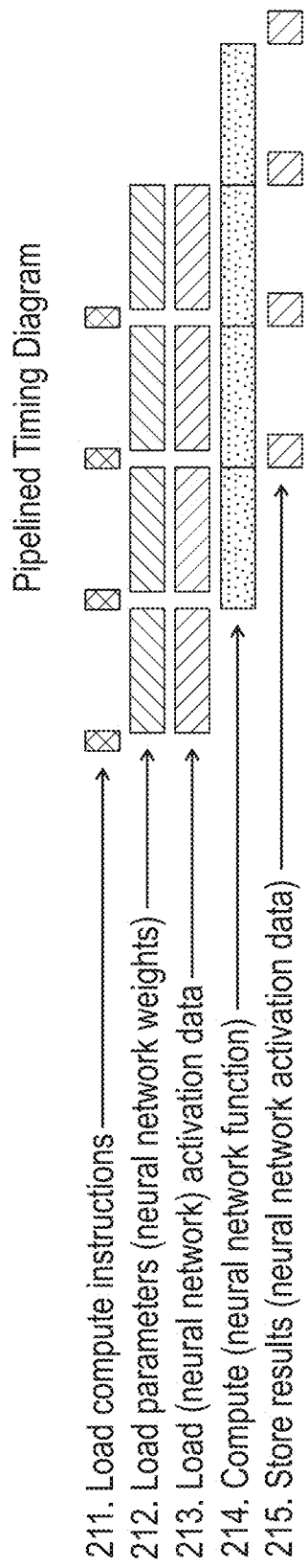
FIG. 3 is a pipelined timing diagram for the IPU of FIG. 2.

Referring to FIG. 3, a pipelined timing diagram is provided for the IPU of FIG. 2. At 211, compute instructions are loaded from model memory 201 to neural computation unit 203. At 212, parameters (e.g., neural network/synaptic weights) are loaded from model memory 201 to neural computation unit 203. At 213, neural network activation data are loaded from activation memory 202 to neural computation unit 203. As noted above, the activations are provided to the axons of the particular neural network defined by the model, and may originate from the same or another neural computation unit, or from outside the system. At 214, neural computation unit 203 performs the computation to generate output neuron activations. In particular, the computation comprises applying the input synaptic weights to the input activations. It will be appreciated that various methods are available for performing such computations, including in silico dendrites, as well as vector multiplication units. At 215, the results from computation are stored in activation memory 202. As pictured, these stages may be pipelined, in order to provide efficient usage of the neural computation unit.

Figure 4:
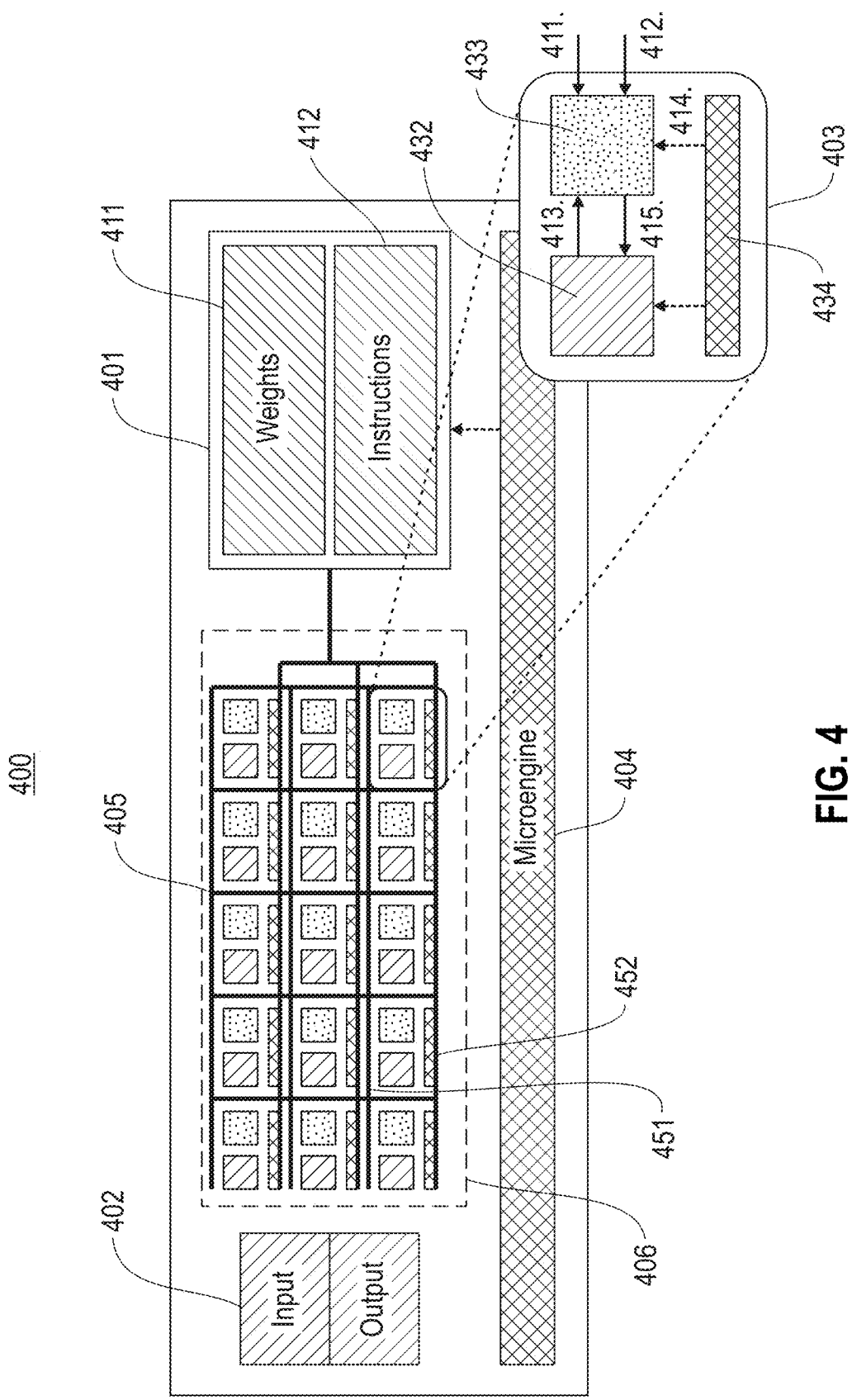
FIG. 4 illustrates a multi-core Inference Processing Unit (IPU) according to embodiments of the present disclosure.

Referring to FIG. 4, a multi-core Inference Processing Unit (IPU) is illustrated according to embodiments of the present disclosure. IPU 400 includes a model memory 401 for the neural network model. As described above, the neural network model may include the synapse weights for a neural network to be computed. IPU 400 includes an activation memory 402, which may be transient. Activation memory 402 may be divided into input and output regions, and stores neuron activations for processing. IPU 400 includes a plurality of cores 403. Each core 403 includes a neural computation unit 433, which is loaded with a neural network model from model memory 401. Each core also include a local activation memory 432. Input activations are provided from local activation memory 432 in advance of each computation step. Outputs from neural computation unit 433 are written back to activation memory 432 for processing on the same or another neural computation unit.

IPU 400 includes an array 406 of neural cores 403. Each core 403 includes a computation unit 433, which is loaded with a neural network model from model memory 401 and is operative to perform vector computation. Each core also includes a local activation memory 432. Input activations are provided from local activation memory 432 in advance of each computation step. Outputs from computation unit 433 are written back to activation memory 432 for processing on the same or another computation unit.

IPU 400 includes one or more network-on-chip (NoC) 405. In some embodiments, a partial sum NoC 451 interconnects the cores 403 and transports partial sums among them. In some embodiments, a separate parameter distribution NoC 452 connects cores 403 to memory 401 for distributing weights and instructions to cores 403. It will be appreciated that various configurations of NoC 451 and 452 are suitable for use according to the present disclosure. For example, broadcast networks, row broadcast networks, tree networks, and switched networks may be used.

In various embodiments a global microengine 404 is included in IPU 400. In various embodiments, a local core controller 434 is included on each core 403. In such embodiments, the direction of operations is shared between the global microengine (chip microengine) and the local core controller (core microengine). In particular, at 411, compute instructions are loaded from model memory 401 to the neural computation unit 433 on each core 403 by global microengine 404. At 412, parameters (e.g., neural network/ synaptic weights) are loaded from model memory 401 to the neural computation unit 433 on each core 403 by global microengine 404. At 413, neural network activation data are loaded from activation local activation memory 432 to neural computation unit 433 on each core 403 by local core controller 434. As noted above, the activations are provided to the axons of the particular neural network defined by the model, and may originate from the same or another neural computation unit, or from outside the system. At 414, neural computation unit 433 performs the computation to generate output neuron activations as directed by local core controller 434. In particular, the computation comprises applying the input synaptic weights to the input activations. It will be appreciated that various methods are available for performing such computations, including in silico dendrites, as well as vector multiplication units. At 415, the results from computation are stored in local activation memory 432 as directed by local core controller 434. As described above, these stages may be pipelined, in order to provide efficient usage of the neural computation unit on each core. It will also be appreciated that inputs and outputs may be transferred from local activation memory 432 to global activation memory 402 according to the requirements of a given neural network.

Computation unit 433 performs the computation to generate output neuron activations as directed by local core controller 434. In particular, the computation comprises applying the input synaptic weights to the input activations. It will be appreciated that various methods are available for performing such computations, including in silico dendrites, as well as vector multiplication units. The results from computation are stored in local activation memory 432 as directed by local core controller 434. These stages may be pipelined, in order to provide efficient usage of the computation unit on each core. It will also be appreciated that inputs and outputs may be transferred from local activation memory 432 to global activation memory 402 according to the requirements of a given neural network.

Accordingly, the present disclosure provides for runtime control of operations in an Inference Processing Unit (IPU). In some embodiments, the microengine is centralized (single microengine). In some embodiments, the IPU computation is distributed (performed by an array of cores). In some embodiments, runtime control of operations is hierarchical—both a central microengine and distributed microengines participate.

The microengine or microengines direct the execution of all operations in the IPU. Each microengine instruction corresponds to several sub-operations (e.g., address generation, load, compute, store, etc.) In the distributed case, core microcode is run on the core microengines (e.g., 434). The core microcode includes instruction(s) to execute a full, single tensor operation. For example, a convolution between a weight tensor and a data tensor. In the context of a single core, the core microcode includes instruction(s) to execute a single tensor operation on the locally stored subset of the data tensor (and partial sums). Chip microcode is run on the chip microengine (e.g., 404). Microcode includes instructions to execute all of the tensor operations in a neural network.

Figure 5:
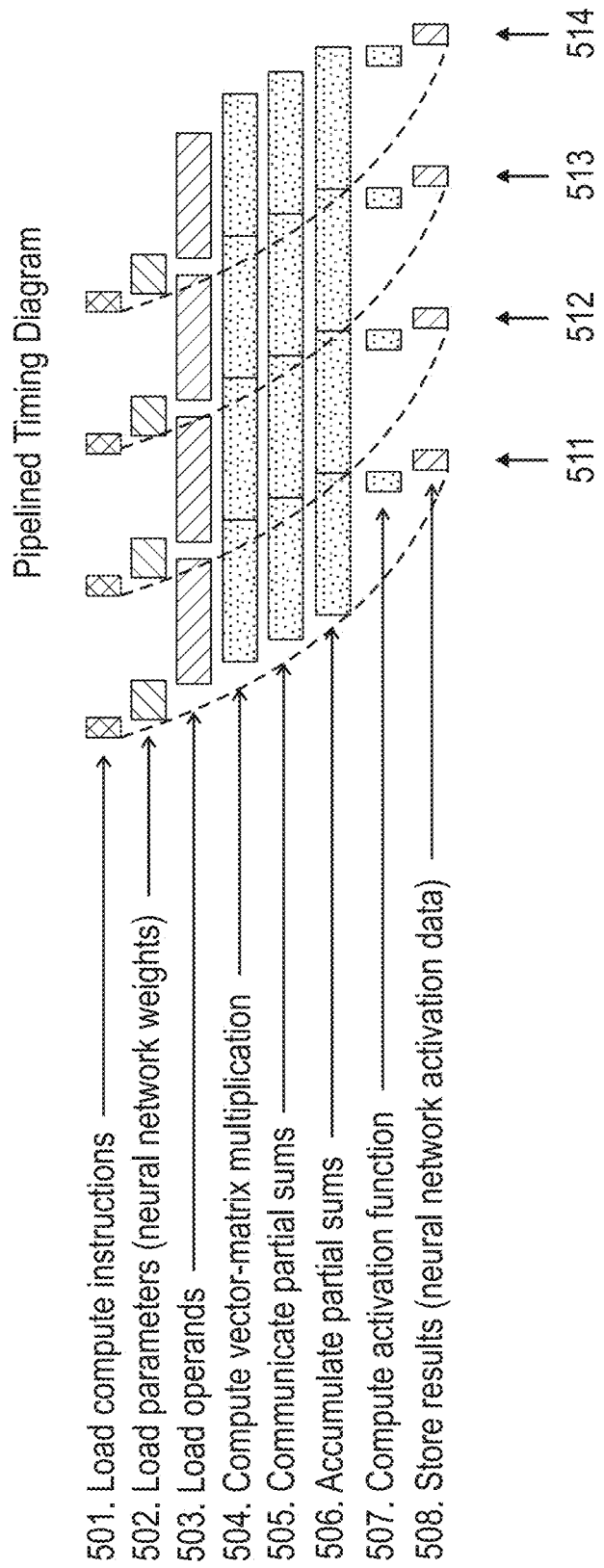
FIG. 5 is a pipelined timing diagram for the IPU of FIG. 4.

Referring to FIG. 5, a pipelined timing diagram is provided, illustrating core operation according to embodiments of the present disclosure. At 501, compute instructions are loaded to the neural computation unit. At 502, parameters (including neural network weights) are loaded to the neural computation unit. At 503, operands are loaded to the neural computation unit. At 504, the vector-matrix multiplication is performed. At 505, the partial sums are communicated. At 506, the partial sums are accumulated. At 507, the activation function is computed. At 1208, the results are stored. Each phase 511 . . . 514 is a different operation. Accordingly, each operation can have an independent parallelism configuration.

The instructions, which in some embodiments are distributed by the chip microengine (404), determines the operations performed by each core (arithmetic, data addressing, partial sum communication, etc.) These instructions may be passed to all cores globally, or may be passed individually to each core, with specific instructions for each core. In the latter case, each core need know only what it needs to do with its current data, the partial sums that are passed to it, and any reshuffle operations. It does not require any global knowledge of the configuration. A new instruction may be passed for each phase of operation, thus the core parallelism configuration may be changed at each phase of operation. For a pipelined core, the current parallelism configuration is kept consistent through the pipeline for each phase, enabling overlapped (pipelined) operations.

Accordingly, in various embodiments, the parallelism in the system is dynamically reconfigurable during runtime. In some embodiments, an instruction is used to reconfigure the computational architecture. In some embodiments, multiple instructions are used to reconfigure multiple portions of the computational architecture.

In some embodiments, microcode is provided in a manner consistent with the topology of network 405. For example, row microcode may be provided to row controllers as part of the hierarchy of instruction distribution. Accordingly in various exemplary embodiments, As set out above, a multi-core platform for neural inference includes per-core distributed activation and partial sum memories, as well as a per-chip shared parameter and instruction memory. Parameters and instructions from shared memory to each core. Activations are passed between cores via an on-chip network. Partial sums can be stored locally or passed between adjacent cores. Shared parameter and instruction memory store a copy of each kernel or access pattern, but can write temporary copies to any or all of the core caches.

A schedule provides a spatio-temporal organization of all compute, communication, and memory operations to implement a neural network inference operation on such a distributed, parallel array of neural cores with on-chip memory. In various embodiments, a schedule includes all tensor operations.

As set out above, each core computes a vector matrix multiplication $Z=XW$ where: X is an input data row vector $[1 \times N]$; W is a weight matrix $[N \times M]$; and Z is an output data row vector $[1 \div M]$. Each core applies an activation function $Y=f(Z)$ to the output of the matrix multiplication, where Y is an output data row vector $[1 \div M]$ and $f(\bullet)$ is a linear or non-linear function. This makes up a single neuron operation. For neural network inference, this operation is repeated over many neurons and many layers of neurons, each operating on different data X and potentially different parameters W.

Computation of the output data tensor may be decomposed into smaller problems for computation on one or more physical cores sequentially or in parallel. Accordingly, different sized tensors (having different spatial and feature dimensions) are mapped to the same core array while maintaining efficient utilization of the core array and core compute elements. Data are partitioned across cores at configurable granularity (corresponding to the core-level parallelism). In various embodiments, a NoC is used to distribute the data across the cores.

Schedulers according to various embodiments of the present disclosure are able to ingest any network trained across any deep learning framework. For example, networks may originate from Tensorflow, PyTorch, Caffe2, MxNet, or other frameworks known in the art. In various embodiments, the scheduler is compliant with the ONNX Network Interface standard.

In various embodiments, the scheduler includes a scheme library. The scheme library comprises a plurality of schemes, and maps various deep learning operations to those schemes. A scheme comprises computation and communication primitives necessary to implement a neural network layer. In various embodiments, it is embodied as a C++ class that maps, for a given neural network operation (e.g., convolution), input parameters to assembly code. A scheme may be represented via a C++ class with defined APIs for the scheduler. A scheme may generate assembly that can be converted to opcode via an assembler. Some ops can be realized via intelligent memory management at the core level (e.g., concat layer).

In various embodiments, a scheme includes parameters defining the data format and interaction of a neural network. For example, parameters for the weight kernel may include dimensions (e.g., H×W×D), stride, and dilation. Parameters for the tensor may include input dimensions (e.g., H×W×D), and output dimensions (e.g., H×W×D). Parameters for the computation may include activation function (e.g., ReLU, sigmoid, etc.), tensor operation (e.g., cony, pooling, multiplication, reshape, etc.), or bias and normalization parameters. Parameters for layer precision may include current and next layer. Batch size may also be specified.

In various embodiments, a scheme includes parameters defining the architecture of a neural network. For example, parameters for core array size, vector-matrix multiplication size, memory sizes and banks, and network-on-chip bandwidths may be provided.

In various embodiments, the scheduler includes a graph sequencer. In some embodiments, each node in the computation graph corresponds to a scheme. Such a graph can be used to establish precedence relationship between logical cores. For some networks, the graph may be DAG. The precedence relationship between cores is used to ensure that each operation is scheduled for computation on a physical core only after all incoming edges to it are already scheduled. A network is traversed using a breadth first traversal. A breadth-first schedule (BFS) is preferred in various embodiments to a depth-first schedule (DFS). In particular, during graph traversal, BFS schedules nodes in the graph on the cores in the order that they are discovered. For example, with BFS, nodes within each layer are scheduled first, before nodes in the next layer of the graph. The sequencer determines the sequence of operations of the nodes of the graph based on determining the optimal combinations of schemes (across layers) that minimizes data movement and maximizes throughput. The sequencer accommodates both feedforward graphs as well as recurrent structures.

For example, a given core that is already loaded with weight parameters may perform consecutive computations in the graph that use those same weights. Similarly, a node in the computation graph may be scheduled on a core that already has the necessary input activations for its computation.

In various embodiments, the scheduler provides memory management as described above. Given a network graph, the scheduler first sequentializes the graph. After sequentializing the graph, it performs a static memory check to see if that graph can fit within the memory constraints of the core activation memory. In various embodiments, sequentializing and memory fitting are performed as a joint optimization. In various embodiments, memory management accommodates branching, recurrent structures in the graph.

In various embodiments, the scheduler generates global activation addresses programmatically for all cores. In some embodiments, the scheduler generates global weight addresses to be delivered to the cores programmatically. Likewise, it generates the local core read/write activation addresses and the local core weight addresses. All address generation ensures that there is no bank or address conflict while read/write and addresses are contiguous in memory.

In various embodiments, the scheduler provides programming of weights in global memory and configures the interconnect. The scheduler receives a graph and learned weights for each node of the graph with the topology of the global weight interconnect network. The scheduler determines the locations to program the weights such that access latencies are guaranteed. This can be deterministically programmed for every layer since every scheme has a specific access pattern. The scheduler configures the global interconnect for every layer (node) of the network for appropriately accessing the weights programmed in the global memory.

In various embodiments, the scheduler provides a timing module for delivery of instructions, weights, and activations. For example, various embodiments include unidirectional wires (e.g., 512) for distribution of weights and instructions, flowing from east to west on a chip such as depicted above in FIG. 4. Various embodiments include bidirectional wires (e.g., 512) for distribution of partial sums, flowing east/west and north/south on a chip such as depicted above in FIG. 4. Various embodiments include unidirectional wires (e.g., 256 in each direction), flowing from north to south and from south to north on a chip such as depicted above in FIG. 4.

Given these networks for every layer (or node) of the graph the scheduler determines the timing for instruction delivery to the cores, weight delivery to the cores, activation delivery to the cores, and synchronization between chip microcode and core microcode.

In various embodiments, the scheduler determines optimal batch size for every layer and for all layers of the graph. Every scheme has different utilization for different batch sizes. The batch size for a scheme is constrained by core activation memory. Given a graph, the scheduler determines optimal batch size for each stage of the graph before it starts scheduling the ops. This batch size will be used by the runtime to feed data into the inference engine.

According to various embodiments, a schedule maps the set of logical cores in a system to physical cores along with a sequence number. Given precedence and identity relationships between logical cores, it is desirable to map identical logical cores to the same physical core for energy-efficiency and to map logical cores to physical cores so as to minimize total run-time for the network. In some embodiments, these two preferences may conflict and in some embodiments, one or the other is optimized.

In some embodiments, a scheduler is provided to create a schedule. According to various embodiments, the scheduler ensures that for a given physical core, the core has all the necessary ingredients. According to some embodiments, neuron biases and destinations are loaded on a regular schedule. In some embodiments, weights are loaded on an irregular schedule depending upon weight reuse.

Figure 6:
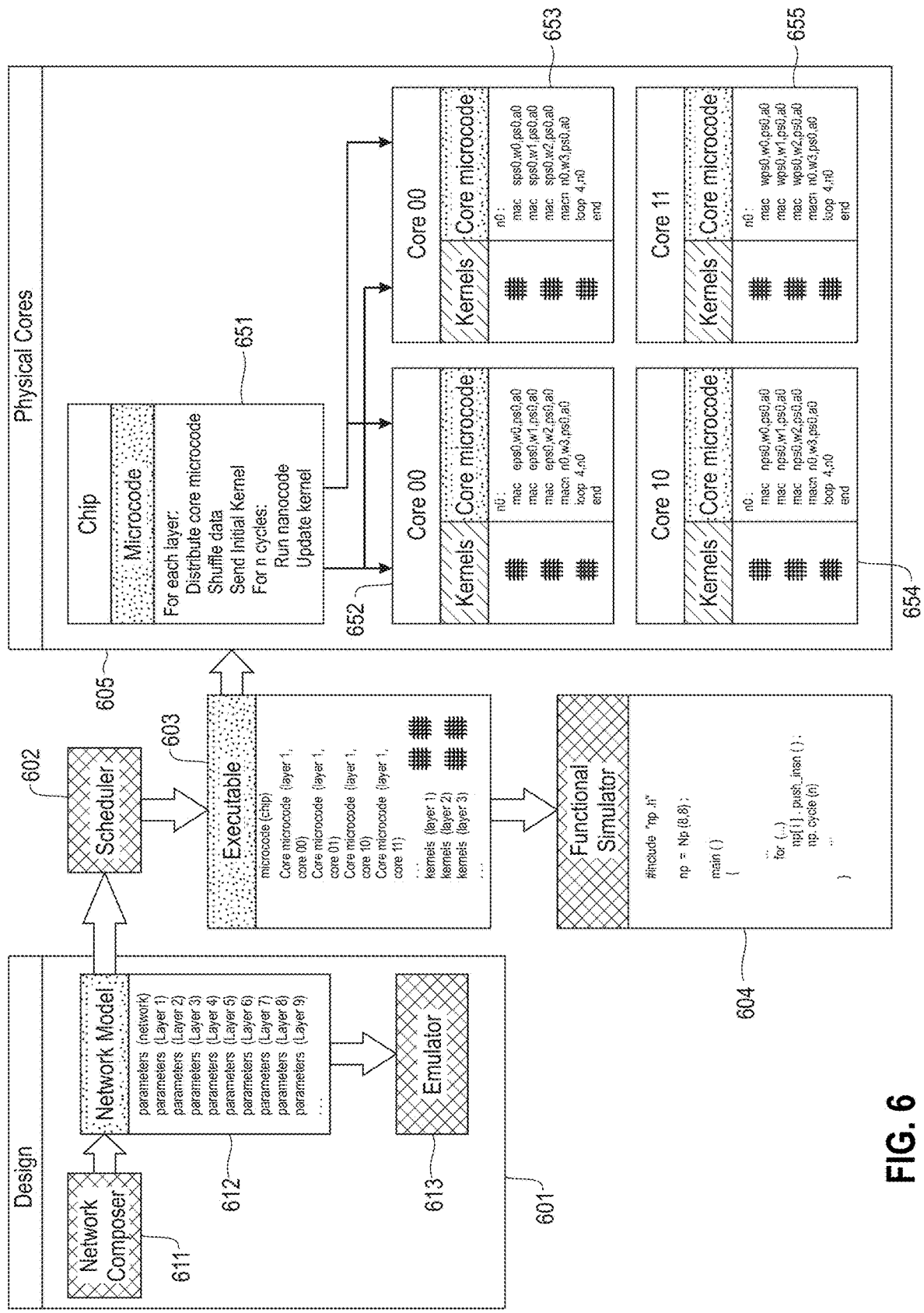
FIG. 6 illustrates an exemplary compilation pipeline according to embodiments of the present disclosure.

Referring to FIG. 6, an exemplary compilation pipeline is illustrated according to embodiments of the present disclosure. In a design phase 601, a network composer 611 is used to generate a network model 612. The network model may be provided emulator 613 for execution of the network model on an emulated platform. The network model is provided to a scheduler 602, which generates a schedule or execution plan for the cores described in the network model. The result of scheduling is an executable 603, which contains the chip-level microcode, core-level microcode, and kernels necessary to execute the neural network described by the model.

Executable 603 may be provided to functional simulator 604 for simulation of the schedule. Executable 603 may also be provided to physical cores 605 for execution on native hardware (such as described above). A given set of physical cores includes one or more chips 651, which receive chip-level microcode. The chip is responsible for distributing core-level microcode to cores, shuffling data among cores, sending initial kernels to cores, and instructing the cores to run core-level microcode and update kernels. In various embodiments, scheduler/microengine 404 performs these tasks at the chip level. Individual cores 652 . . . 655 includes one or more kernels and execute core microcode. In some embodiments, local core controller 434 is responsible for core-level control.

Figure 7:
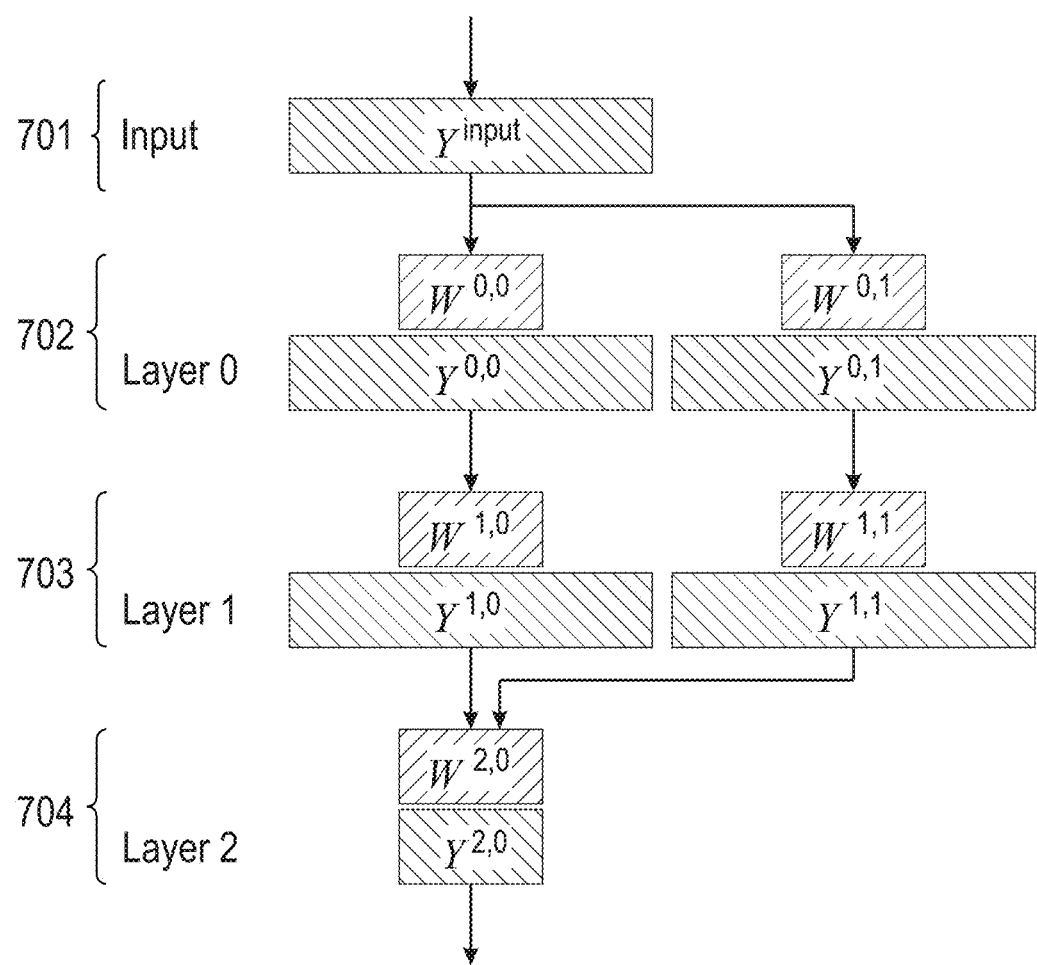
FIG. 7 illustrates an exemplary neural network according to embodiments of the present disclosure.

Referring to FIG. 7, an exemplary neural network is illustrated. In this example, activations $Y^{input}$ are provided from input layer 701 to cores {0,0} and {0,1} in layer 702, where they are multiplied by weight tensors $W^{0,0}$ and $W^{0,1}$ to produce output activations $Y^{0,0}$ and $Y^{0,1}$. Activations $Y^{0,0}$ and $Y^{0,1}$ are in turn fed forward to layer 703 of the neural network where cores {1,0} and {1,1} multiply them by weight tensors $W^{1,0}$ and $W^{1,1}$ to produce output activations $Y^{1,0}$ and $Y^{1,1}$. Activations $Y^{1,0}$ and $Y^{1,1}$ are in turn fed forward to layer 704, where they are multiplied by weight tensor $W^{2,0}$ to produce output activations $Y^{2,0}$.

It will be apparent from this example that each tensor multiplication must be processed in an order that satisfies all input dependencies. For instance, weight tensor $W^{1,1}$ is applied to output map $Y^{0,1}$ produced from tensor $W^{0,1}$. Accordingly, $W^{1,1}$ must be processed after $W^{0,1}$.

Figure 8A:
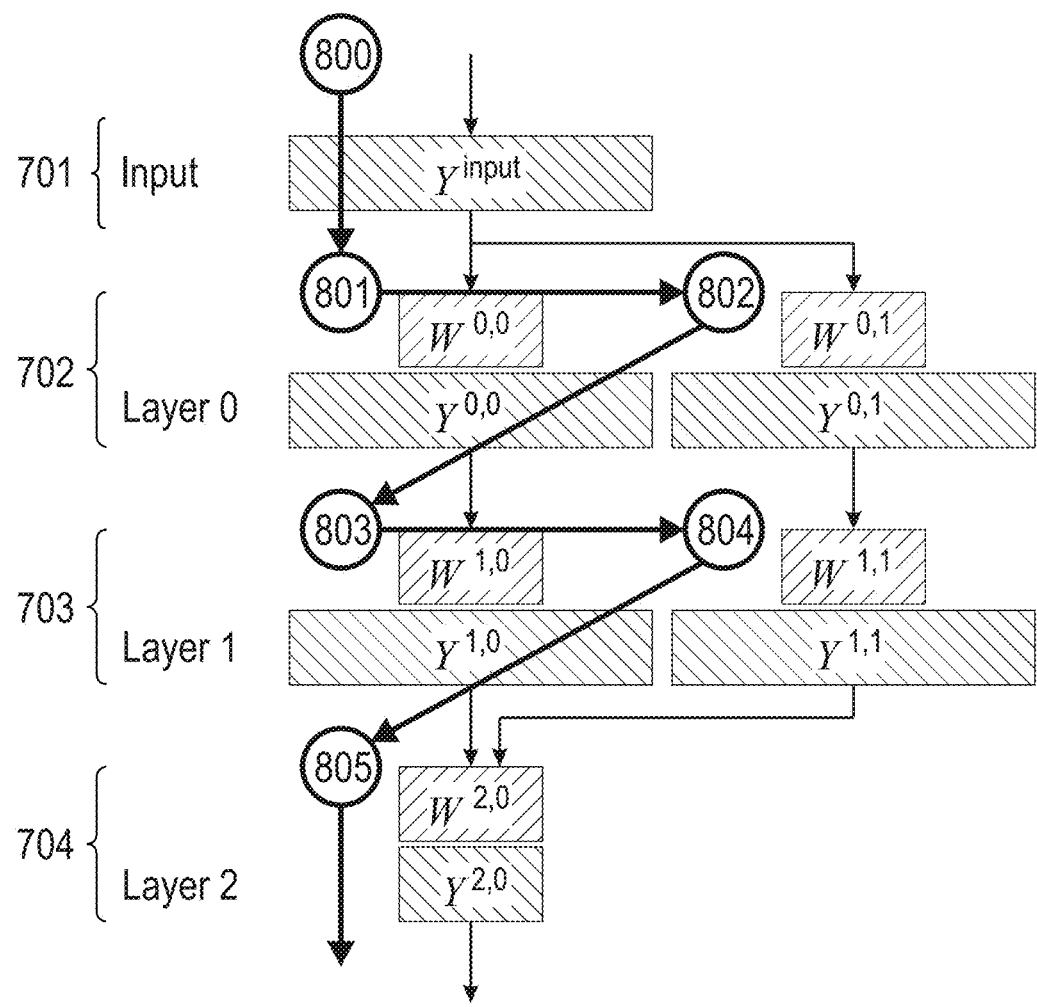
FIGS. 8A-C illustrate an exemplary schedule according to embodiments of the present disclosure.
Figure 8B:
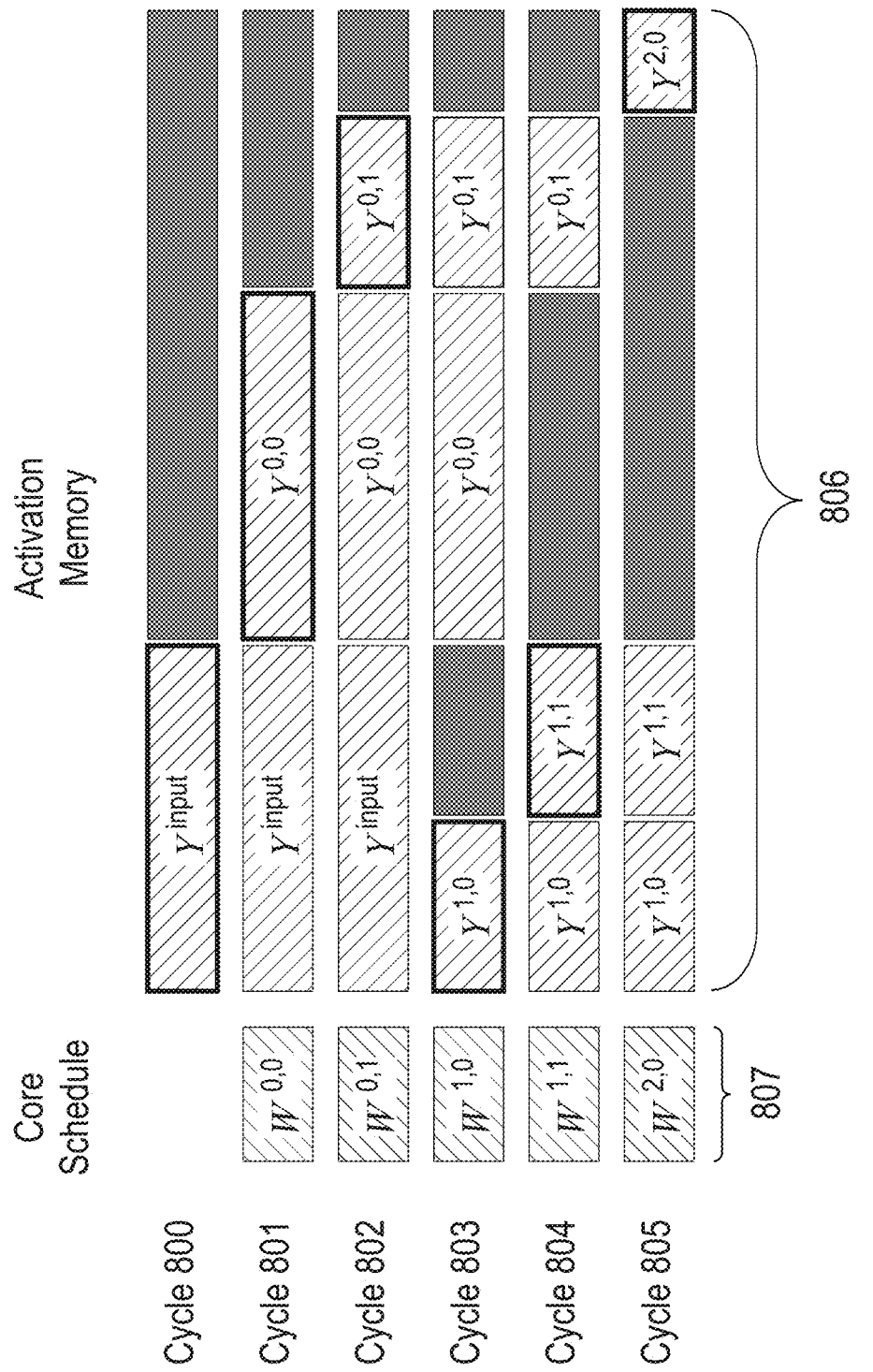
Figure 8C:
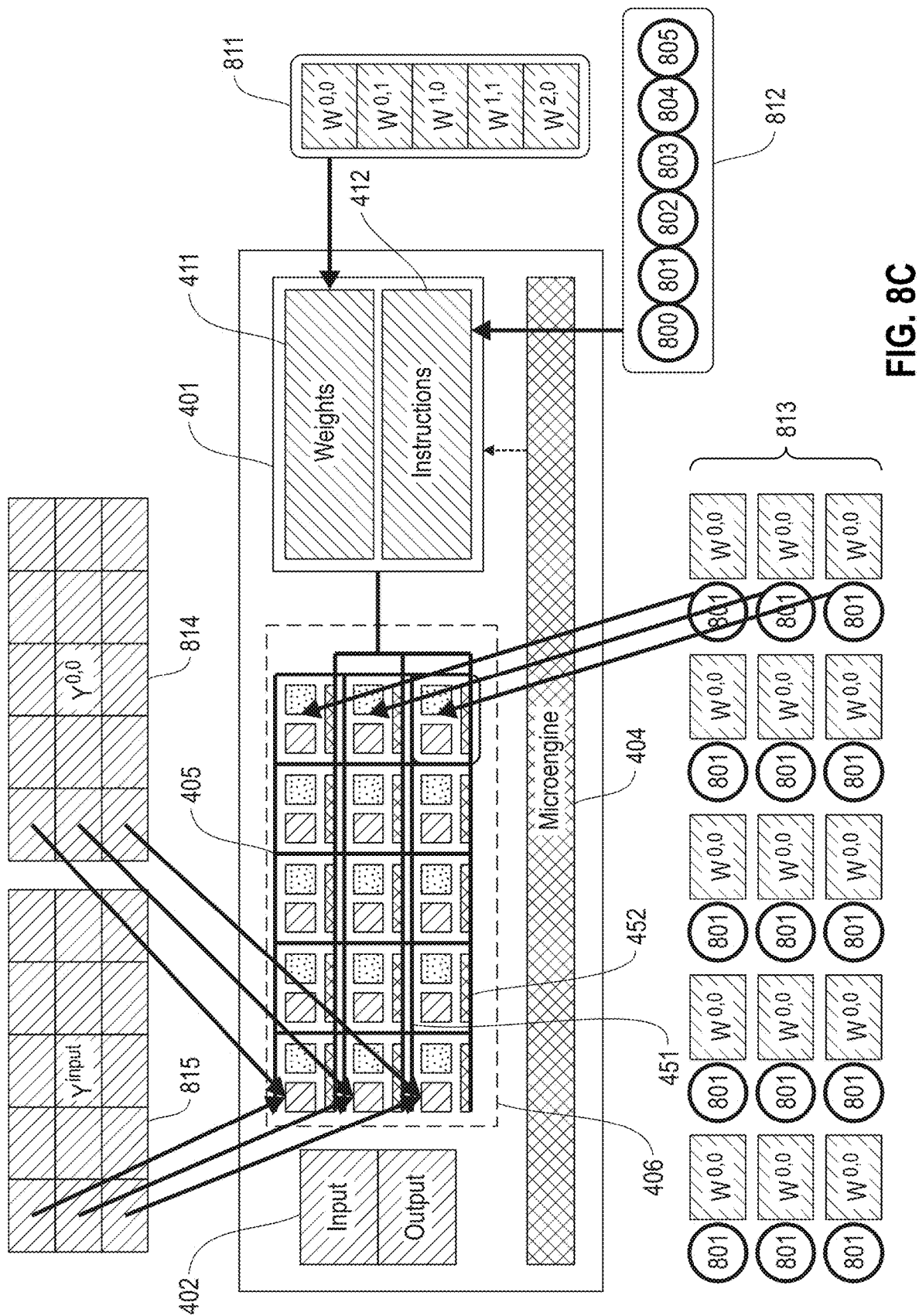

Referring to FIGS. 8A-C, an exemplary schedule is illustrated. In each of cycles 800 . . . 805, neuron activations are written to blocks of activation memory 806 that are allocated according to the schedule generated at compile time. Weight tensors 807 are loaded to the core as necessary at each of cycles 800 . . . 805. Activations are retained in activation memory 806 until all weight tensors that consume them have been processed. At that point, the activation memory can be reallocated and reused.

In FIG. 8C, the schedule is further illustrated with reference to the chip of FIG. 4. Weight memory 411 includes weights 811 for each core in array 406 (in this example, indexed by row and column). Instruction memory 412 includes instructions 812 for each core in array 406, corresponding to each of cycles 800 . . . 805. At a given cycle, the schedule guarantees that instructions and weights 813 are present on the appropriate cores of array 406 (in this example a 3×5 array). Likewise, input activations 815 are mapped to the core array 406. Corresponding to each of cycles 800 . . . 805, the core executes the computation and communication operations to perform the tensor operation on the activation data, given the weights and parameters.

Figure 9A:
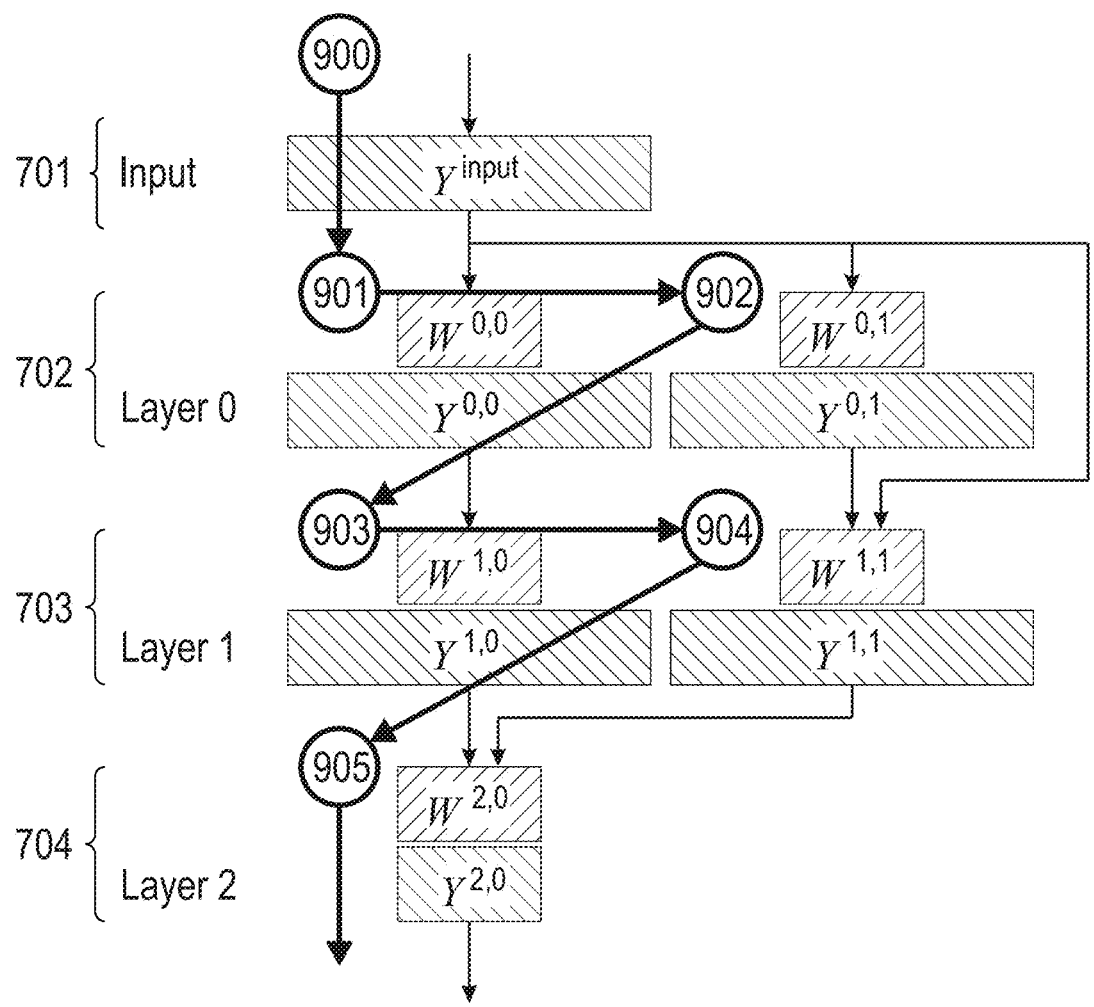
FIGS. 9A-B, illustrate a second exemplary schedule according to embodiments of the present disclosure.
Figure 9B:
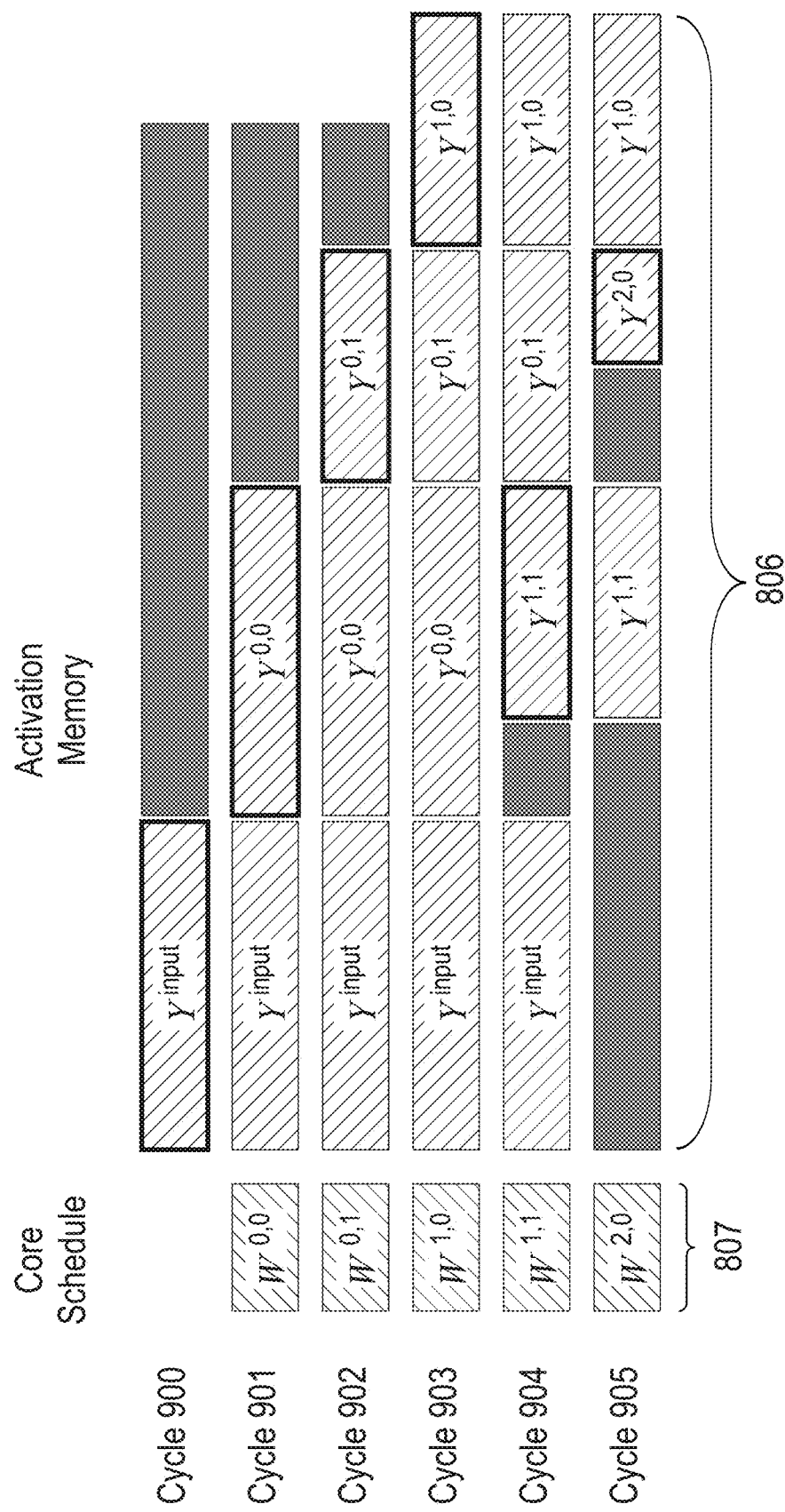

Referring to FIGS. 9A-B, a second exemplary schedule is illustrated. In this example, the network of FIG. 8 has an added edge, such that weight tensor $W^{1,1}$ is applied to both $Y^{0,1}$ and $Y^{input}$. As a result, $Y^{input}$ must be retained in activation memory 806 for more cycles. As a result, applying the same schedule as in FIG. 8 (over cycles 900 . . . 905) results in a memory overrun. Accordingly, activation memory limits the network breadth. The breadth of the network for a given schedule is defined as the largest number of neuron activations that must be maintained in memory at any point in the schedule, in order to satisfy downstream dependencies. In the example network, adding a skip connection from the input layer 701 to the second module in layer 703 broadens the network beyond the capacity of the activation memory 806.

Figure 10A:
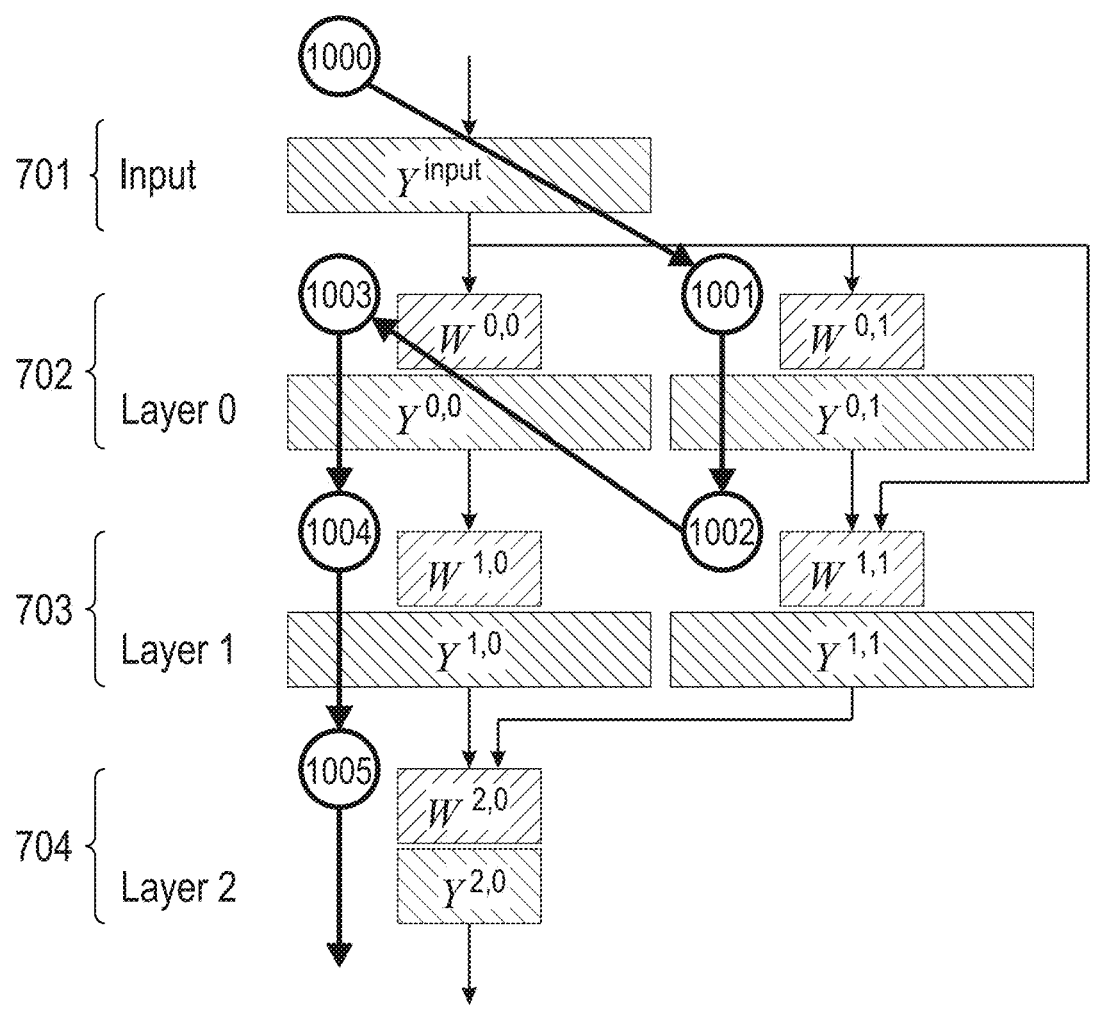
FIGS. 10A-B illustrate a third exemplary schedule according to embodiments of the present disclosure.
Figure 10B:
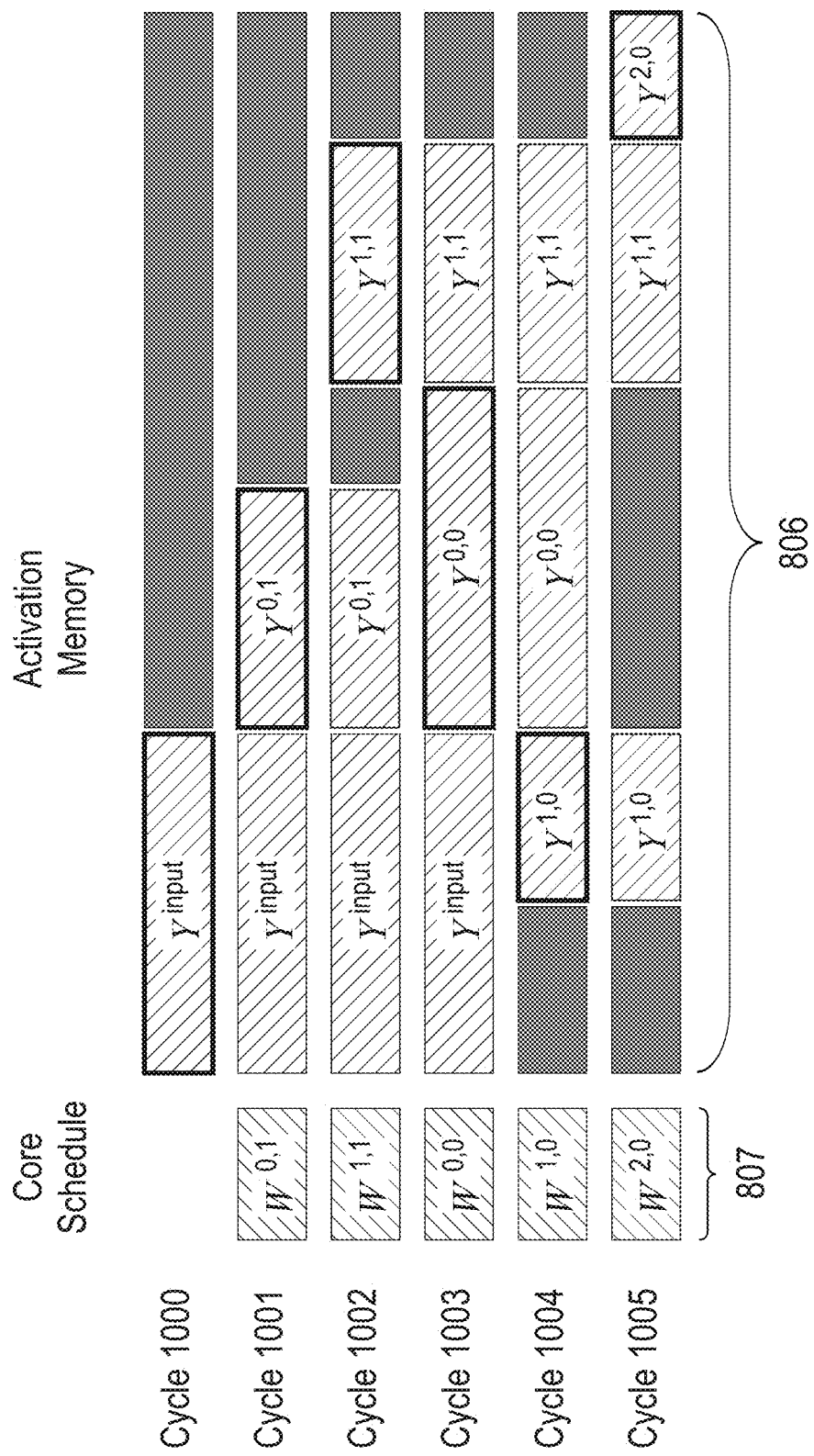

Referring to FIGS. 10A-B, a third exemplary schedule is illustrated. In this example, an alternative schedule (over cycles 1000 . . . 1005) is applied to the network of FIG. 9. By reordering execution, the memory overrun illustrated in FIG. 9 is avoided. Thus, scheduling the modules in a different order narrows the network to a breadth that does fit into the activation memory 806.

Figure 11A:
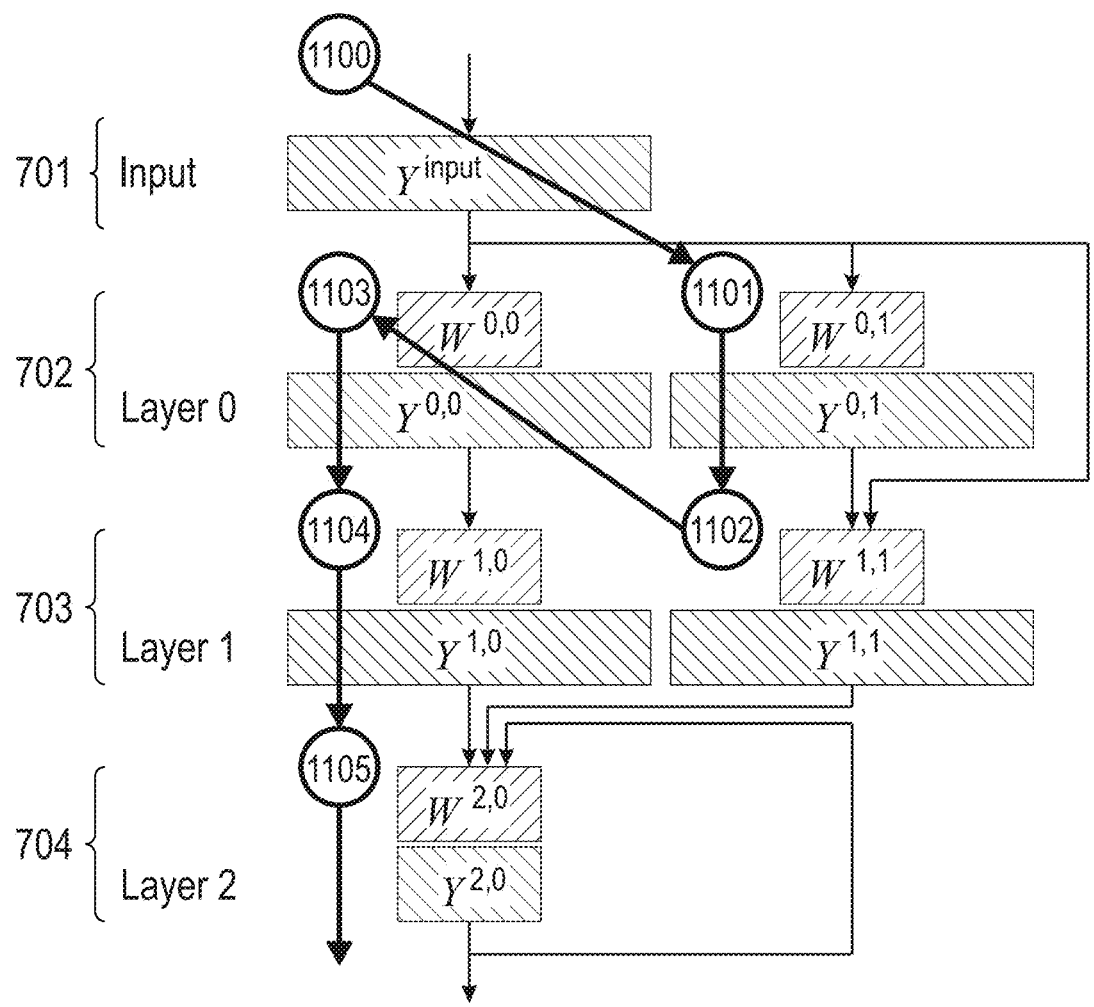
FIGS. 11A-B illustrate a fourth exemplary schedule according to embodiments of the present disclosure.
Figure 11B:
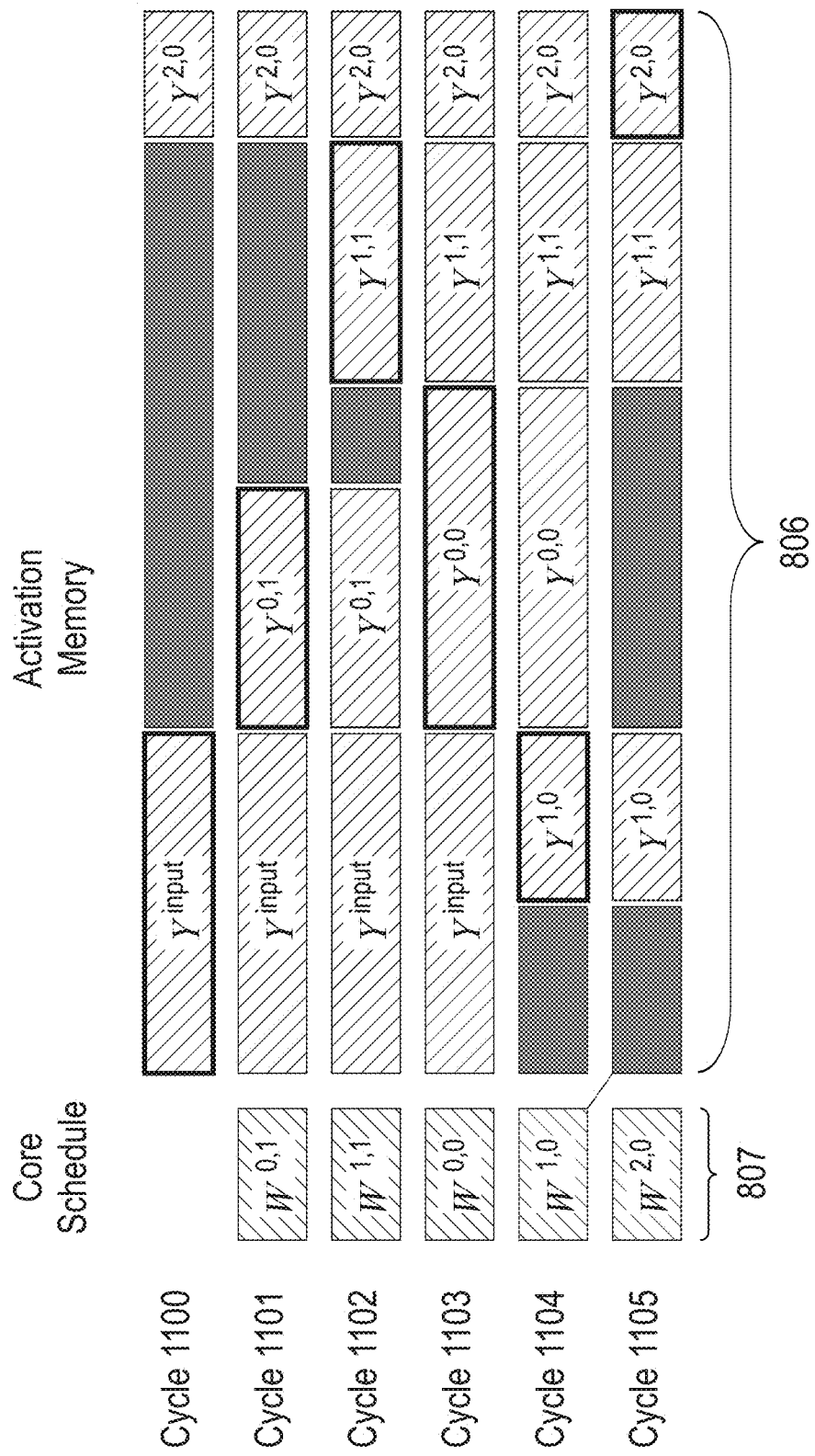

Referring to FIG. 11A-B, a fourth exemplary schedule is illustrated. In this example, a recurrent connection is added to the network of FIG. 10. As shown, recurrent connections establish dependencies that require permanent allocation of activation memory, in this case for activations $Y^{2,0}$.

Figure 12:
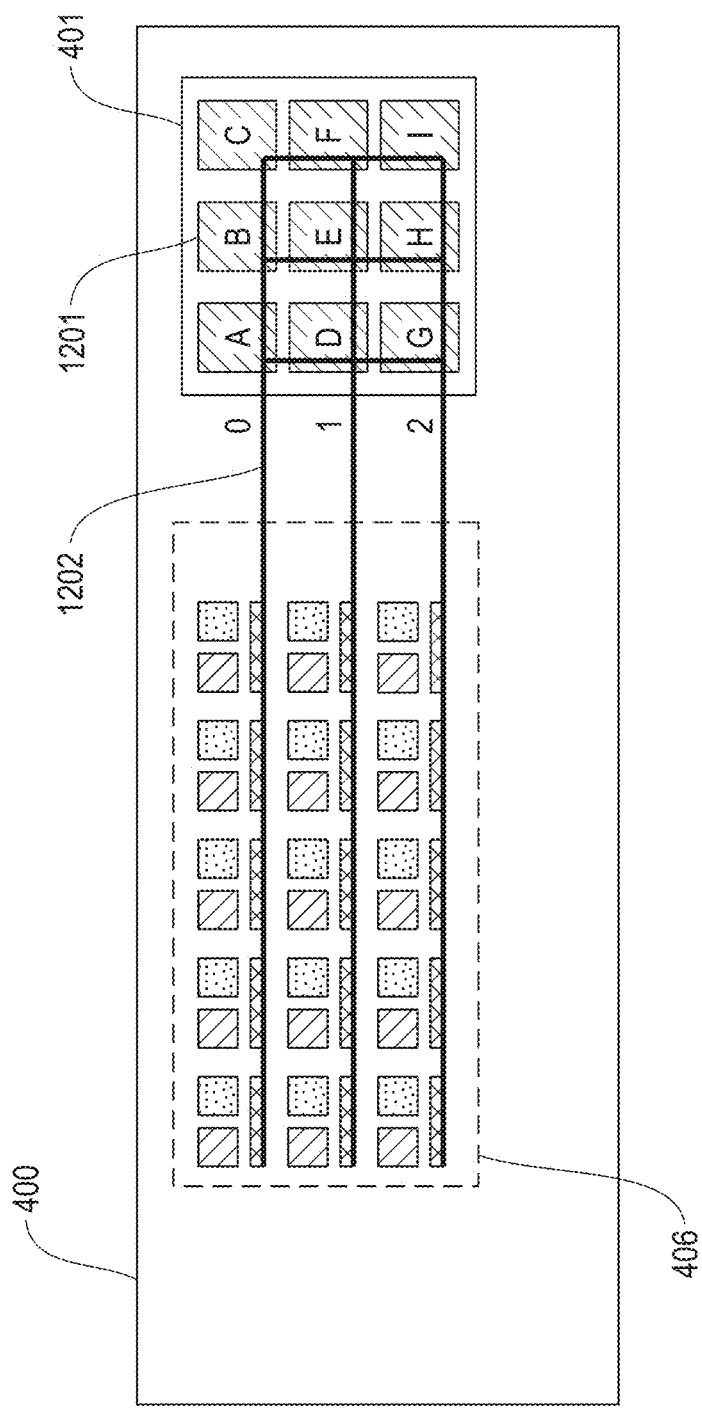
FIG. 12 illustrates global memory interconnect scheduling according to embodiments of the present disclosure.

Referring to FIG. 12, global memory interconnect scheduling is illustrated according to embodiments of the present disclosure. In this example, a simplified view of chip 400 is provided. Memory 401 includes a plurality of banks A . . . I 1201. Cores in array 406 are connected in rows 1202.

In various embodiments, the global memory interconnect mapping is performed as follows. For each tensor in a network, a mapping function is provided that specifies the mapping from the global memory array to the core array. Any weight in any memory bank can be mapped to any set of core array row(s). For example, a weight in bank A can be sent to rows {0, 1, 2}. In another example, weights in bank A can be mapped to row {0}, weight in bank B to row {1}, and weights in bank C to row {2}.

For example, a weight block requires k cycles to be delivered from a bank to the core array. Each tensor operation may require multiple weight blocks, which are located in multiple memory banks. Accordingly, different weight blocks from the same bank can be delivered every k cycles. Thus, for a given network, there is a sequence of mapping functions from the memory banks to the core array provided.

Figure 13:
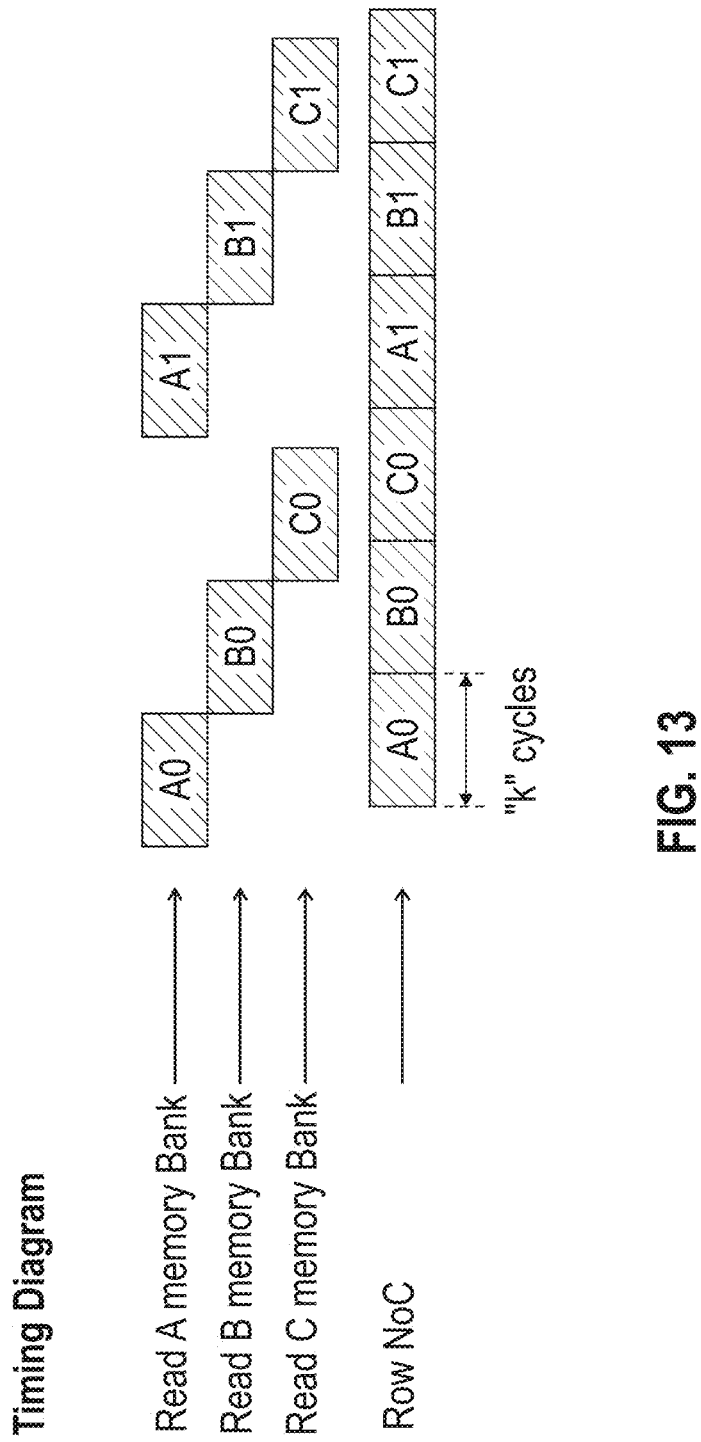
FIG. 13 illustrates a weight distribution schedule via network-on-chip according to embodiments of the present disclosure.

Referring to FIG. 13, a weight distribution schedule via network-on-chip is illustrated according to embodiments of the present disclosure. In various embodiments, access to the network-on-chip is pre-scheduled. By pre-scheduling the NoC access, each memory bank injects its data onto the NoC at its assigned time slot. In this example, reads from banks A . . . C are staggered, resulting in interleaved writes to the NoC. As a result, the Row NoC is conflict free, and at full utilization. In various embodiments, the activation NoC, weight distribution NoC, and partial sum NoCs are disjoint, such that transactions on each bus are all independent and in parallel.

Figure 14:
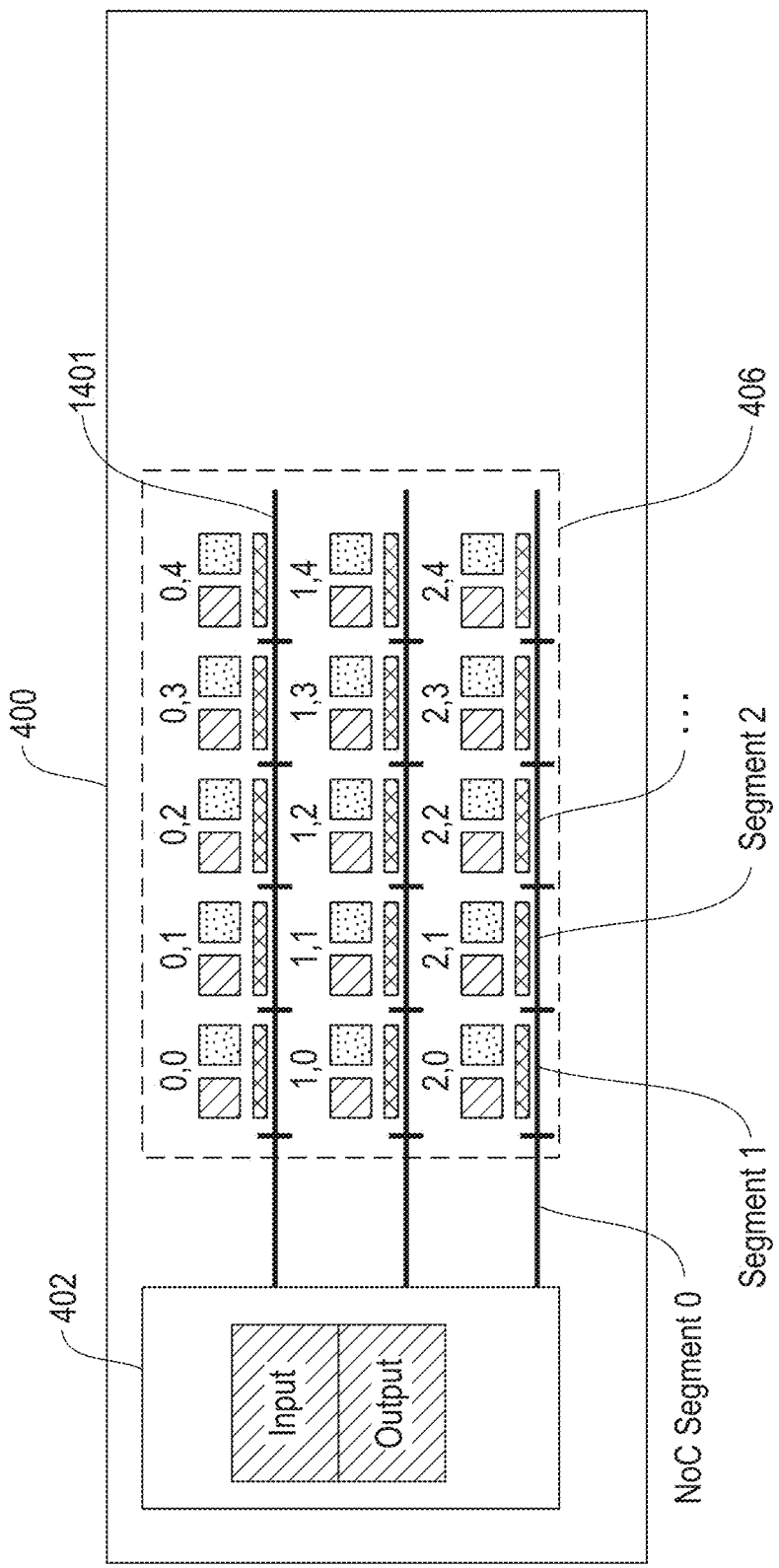
FIG. 14 illustrates activation distribution scheduling according to embodiments of the present disclosure.

Referring to FIG. 14, activation distribution scheduling is illustrated according to embodiments of the present disclosure. In this example, a simplified view of chip 400 is provided. Memory 402 includes a plurality of activation I/O memory banks. Cores in array 406 are connected in rows 1401 of an activation NoC. As shown, each core may be addressed by a row and column coordinate. In a systolic network, the NoC is subdivided into segments, designated by a row number and a segment number. Each core injects data onto a segment of the NoC.

Figure 15:
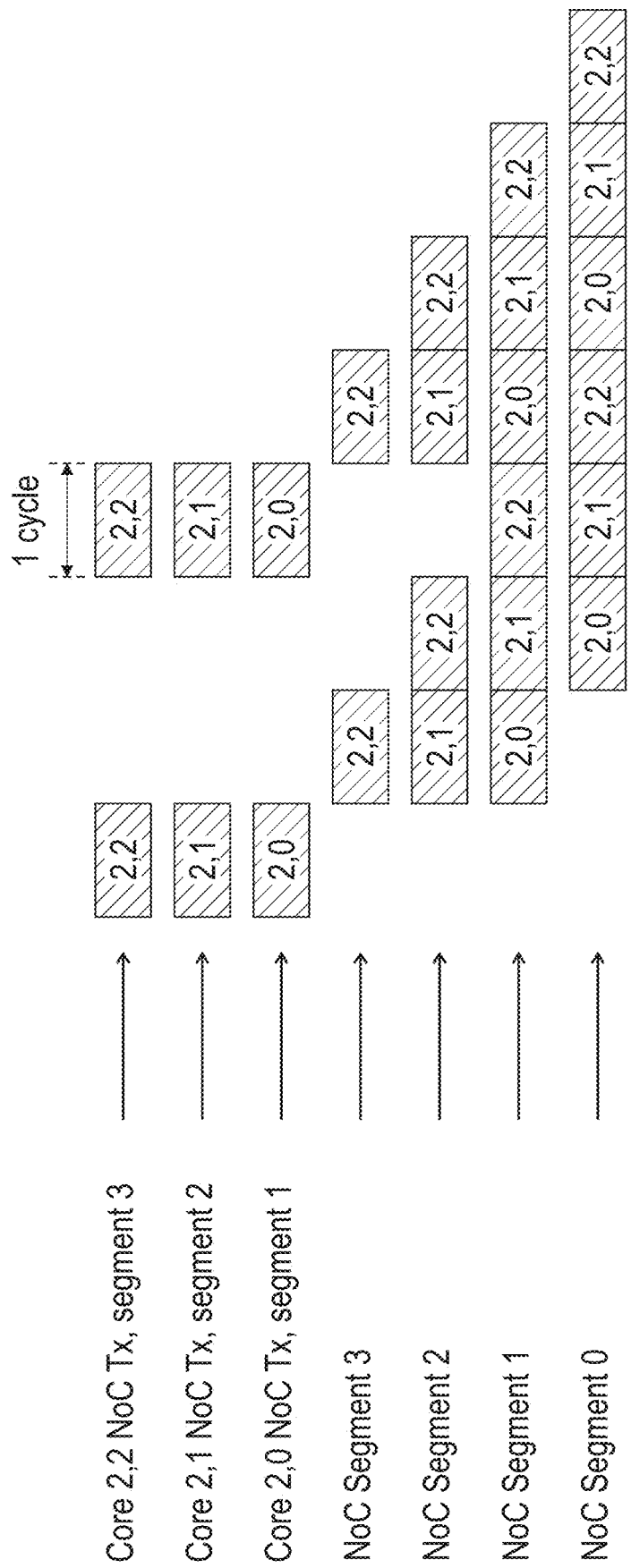
FIG. 15 is an exemplary timing diagram with a systolic NoC according to embodiments of the present disclosure.

Referring to FIG. 15, an exemplary timing diagram with a systolic NoC is provided according to embodiments of the present disclosure. At a given cycle, a block of activations is transmitted onto the NoC segments by each core in parallel. The systolic NoC communicates the activation data to adjacent NoC segments in successive cycles. Data transmitted by the cores and data transmitted systolically by the NoC are interleaved according to the schedule, such that each NoC segment is conflict free.

Figure 16:
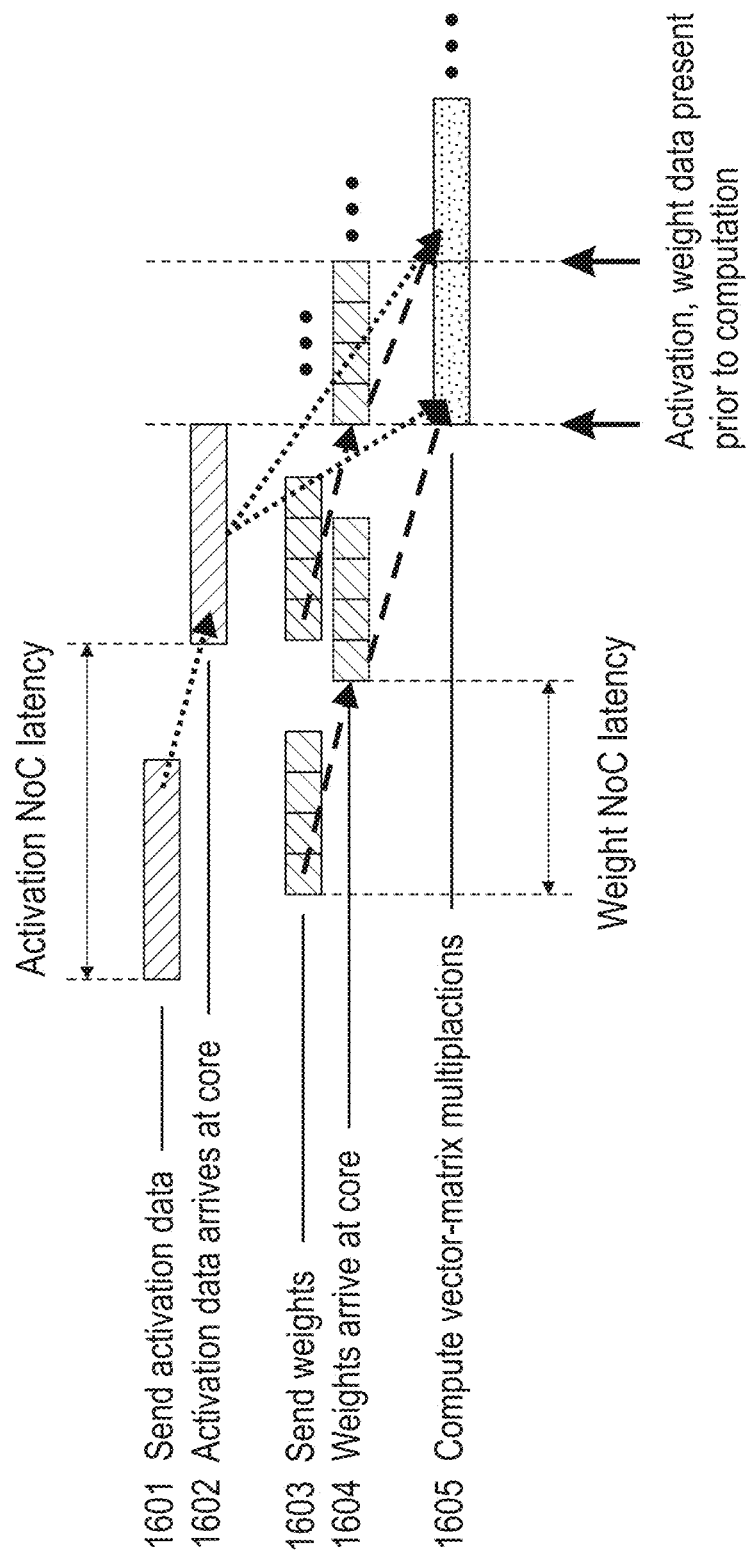
FIG. 16 illustrates an exemplary data delivery and computation schedule according to embodiments of the present disclosure.

Referring to FIG. 16, an exemplary data delivery and computation schedule is illustrated according to embodiments of the present disclosure. A given schedule is responsible for ensuring that the necessary weight, activation, and PS data are present before a given computation. Due to NoC latencies, weight, activation, or PS data are sent ahead of time, in some cases many cycles early. At 1601, activation data are sent, arriving at the target core at 1602. Concurrently, at 1603, weights are sent to the target core, arriving at 1604. Once activations and weight have arrived, computation is performed at 1605. As pictured, weight delivery is pipelined.

Figure 17:
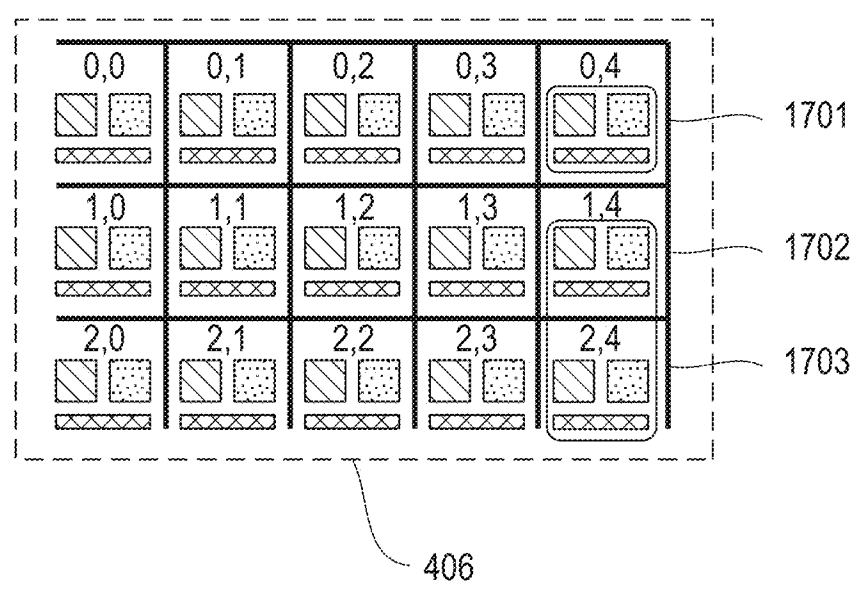

Referring to FIG. 17, an exemplary data delivery and computation schedule is illustrated according to embodiments of the present disclosure. In this example, core 1701 in array 406 accumulates partial sums from cores 1702 . . . 1703.

Figure 18:
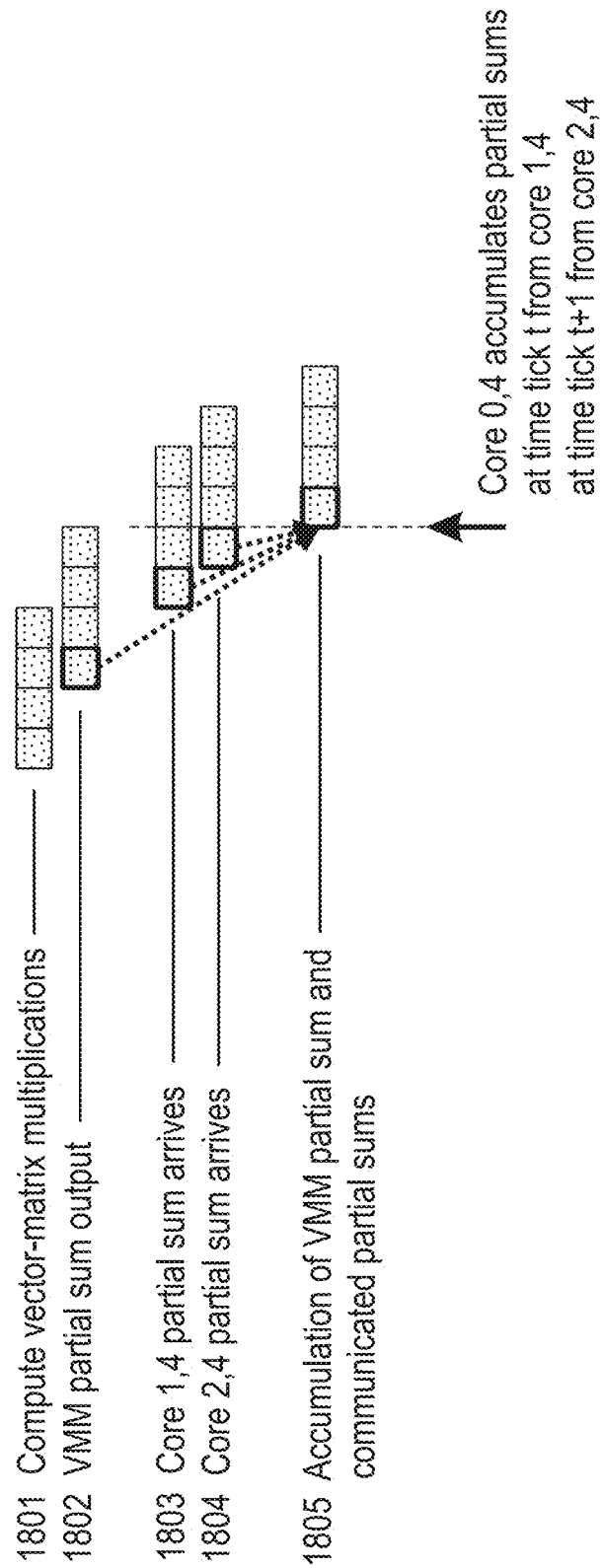
FIG. 18 is an exemplary timing diagram for the example of FIG. 17.

Referring to FIG. 18, a timing diagram is provided for the example of FIG. 17. It will be appreciated that a well-formed schedule will guarantee that the communication of partial sums is conflict free and the necessary data arrive prior to computation. At 1801, vector-matrix multiplication is performed at each of cores 1701 . . . 1703. At 1802, the partial sum results of the vector-matrix multiplication is output from cores 1702 . . . 1703. At 1803, the partial sum from core 1702 arrives at core 1701. At 1804, the partial sum from core 1703 arrives at core 1701. At 1805, the partial sums, both locally computed and received, are accumulated. As pictured, core 1701 accumulates partial sums at time tick t from core 1702 and at time tick t+1 from core 1703.

Figure 19:
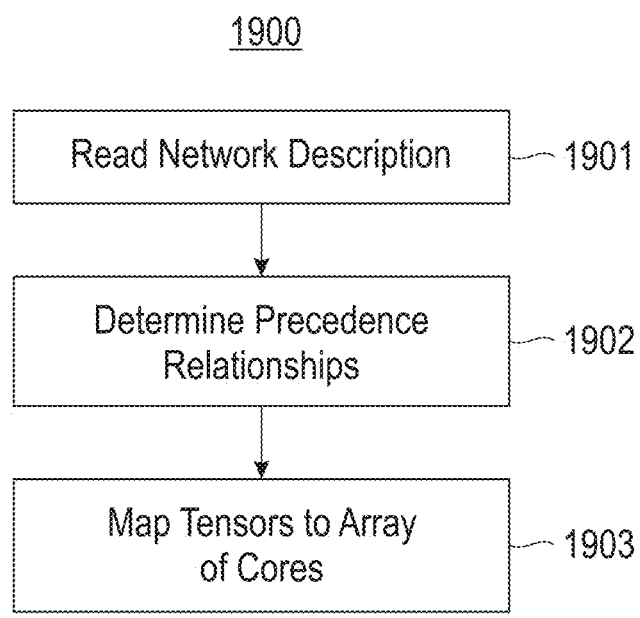
FIG. 19 illustrates a method for mapping logical neural cores to physical neural cores according to embodiments of the present disclosure.

Referring to FIG. 19, a method for mapping neural network layers to physical neural cores is illustrated according to embodiments of the present disclosure. At 1901, a neural network description describing a plurality of neural network layers is read. Each of the plurality of neural network layers has an associated weight tensor, input tensor, and output tensor. At 1902, a plurality of precedence relationships among the plurality of neural network layers is determined. At 1903, the weight tensor, input tensor, and output tensor of each of the plurality of neural network layers are mapped onto an array of neural cores.

In various embodiments, methods and systems are provided for executing neural instruction distributed on a set of neural cores. In some embodiments, the sequence of microcode instructions operate the whole chip, while the sequence of core microcode instructions operate each individual neural core.

In various embodiments, methods are provided to compile a neural network model to microcode and core microcode instructions and create the associated schedule of instructions that needs to be executed to operate the whole chip. In various embodiments, methods and systems are provided to efficiently map an arbitrary dimensional tensor onto any set of neural cores such that the computational efficiency is maximized, memory access is efficient, and re-shuffling of activations is minimized. In various embodiments, methods are provided to schedule kernels onto cores by using the kernel dependency graph to deterministically satisfy all input dependencies.

In various embodiments, systems and methods are provided to schedule computation on the neural cores such that kernel reuse is maximized across clock cycles hence making the neural computation energy efficient. In various embodiments, methods are provided to allocate neuron activation memory according to a deterministic schedule specified at compile time. In some embodiments, activations in memory are retained until all kernels that use them have been processed. In some embodiments, the activation memory is reallocated and reused in order to process a large network. In some embodiments, recurrent connections are not reallocated. Network breadth is limited by activation memory size, but not network depth. In some embodiments, a network is narrowed to a breadth that fits into activation memory, if possible, by scheduling kernels in a different order.

In various embodiments, methods and systems are provided to schedule any arbitrary directed graph of a deep neural network onto an array of neural cores. In some embodiments, methods and systems for simulating the schedule of neural instructions distributed on a set of neural cores are provided. In some embodiments, the exact number of cycles required to process each layer of a deep neural network is computed. In some embodiments, the schedule can be dynamically re-configured at run-time. In some embodiments, a neural network is scheduled onto an array of neural cores such that the memory access patterns of the activation memory is coalesced and contention free. In some embodiments, a neural network is scheduled onto an array of neural cores such that the communication patterns of each of the various NoCs are coalesced and contention free.

Figure 20:
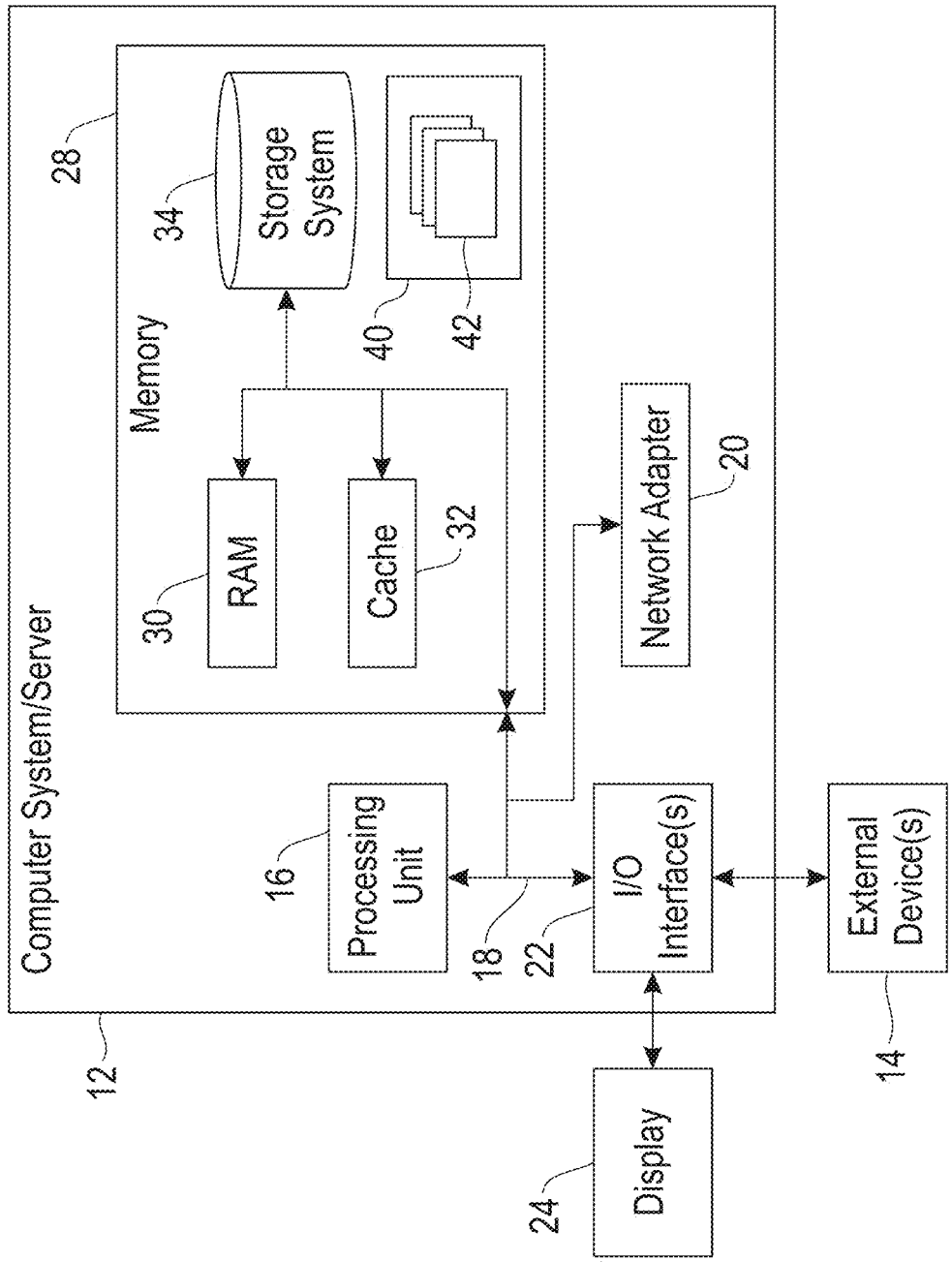
FIG. 20 depicts a computing node according to an embodiment of the present disclosure.

Referring now to FIG. 20, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 20, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
reading a neural network description describing a plurality of neural network layers, each of the plurality of neural network layers having an associated parameter tensor, weight tensor, input tensor, and output tensor;
determining a plurality of precedence relationships among the plurality of neural network layers and a plurality of logical cores, wherein each logical core corresponds to a neural network layer, wherein the precedence relationships are based on connections among the plurality of neural network layers;
based on the plurality of precedence relationships, generating a sequence of the plurality of neural network layers and a sequence of the plurality of logical cores;
identifying a set of identical logical cores from the plurality of logical cores, wherein the identical logical cores correspond to identical neural network layers, wherein the identical neural network layers are associated with identical parameter tensors and identical weight tensors; and
mapping the plurality of logical cores onto an array of neural cores such that the identical logical cores are mapped onto a same neural core, wherein the mapping of the plurality of logical cores on the array of neural cores comprises:
determining a plurality of sequence numbers, each sequence number of the plurality of sequence numbers corresponding to one neural core of the array of neural cores,
mapping the associated parameter tensor, weight tensor, input tensor, and output tensor of each of the plurality of neural network layers onto the array of neural cores, and
determining a schedule for delivery of the weight tensor, the input tensor, and the output tensor of each of the plurality of neural network layers in accordance with the plurality of sequence numbers, the data delivery being at each of the plurality of neural cores for computation of each neural network layer of the plurality of neural network layers.

2. The method of claim 1, wherein the mapping of the weight tensor, the input tensor, and the output tensor comprises computation and communication operations.

3. The method of claim 2, further comprising:
generating microcode, the microcode executable by a chip to compute the plurality of neural network layers, the chip comprising the array of neural cores.

4. The method of claim 3, further comprising:
generating core microcode, the core microcode executable by the array of neural cores to generate partial sums.

5. The method of claim 3, further comprising:
generating chip microcode, the chip microcode executable by at least one chip microengine to distribute weights, parameters, instructions, and/or activation data to the array of neural cores.

6. The method of claim 1, wherein the mapping of the weight tensor, input tensor, and output tensor comprises determining a memory allocation for the weight tensor, input tensor, and output tensor of each of the plurality of neural network layers.

7. The method of claim 6, wherein the mapping of the weight tensor, input tensor, and output tensor comprises: determining a memory allocation for plurality of partial sums of each of the plurality of neural network layers.

8. The method of claim 6, wherein the mapping of the weight tensor, input tensor, and output tensor comprises: determining a memory allocation for the weight tensor in a global memory.

9. The method of claim 8, wherein the mapping of the weight tensor, input tensor, and output tensor comprises: determining a plurality of mapping functions of the weight tensor to local memories of the neural cores.

10. The method of claim 6, wherein the mapping of the weight tensor, input tensor, and output tensor comprises: determining a memory allocation for the input tensor and output tensor in local memories of the neural cores.

11. The method of claim 10, wherein the memory allocation minimizes a transfer of activations among cores.

12. The method of claim 10, wherein determining the memory allocation comprises sequencing the plurality of neural network layers to conform to a local memory limit.

13. The method of claim 10, wherein the schedule for the data delivery is determined such that the memory allocation is applied when the execution requires the input tensor and output tensor.

14. The method of claim 13, wherein the local memories are reallocated repeatedly according to the schedule for the data delivery.

15. The method of claim 1, wherein each layer of the neural network has an associated tensor operation, the method further comprising:
selecting a parametrized scheme from a library of parametrized schemes, the selected scheme corresponding to the tensor operation, wherein:
the mapping comprises instantiating the selected scheme with parameters corresponding to the tensor operation.

16. The method of claim 15, wherein the mapping comprises determining an execution schedule comprising a plurality of operations for the array of neural cores, the execution schedule guaranteeing data delivery at each of the plurality of neural cores for the computation of each neural network layer.

17. The method of claim 16, wherein the execution schedule comprises computation and communication operations.

18. The method of claim 17, wherein the execution schedule further comprises no operations (NOPs).

19. The method of claim 1, wherein the mapping comprises determining a network schedule, wherein the network schedule determines a timing of communications on one or more networks.

20. The method of claim 19, wherein the one or more networks comprises a weight network, an instruction network, an activation network, or a partial sum network.

21. The method of claim 20, wherein the network schedule precludes simultaneous transmission on each network.

22. The method of claim 19, wherein the network schedule guarantees data delivery at each of the plurality of neural cores for each computation using said data.

23. The method of claim 1, wherein the mapping comprises determining a batch size.

24. The method of claim 23, wherein the batch size is unique for at least one neural network layer.

25. A system comprising:
a chip comprising a controller and an array of neural cores;
a computing node comprising a computer readable storage medium having program instructions embodied therewith, the program instructions executable by a processor of the computing node to cause the processor to perform a method comprising:
reading a neural network description describing a plurality of neural network layers, each of the plurality of neural network layers having an associated parameter tensor, weight tensor, input tensor, and output tensor;
determining a plurality of precedence relationships among the plurality of neural network layers and a plurality of logical cores, wherein each logical core corresponds to a neural network layer, wherein the precedence relationships are based on connections among the plurality of neural network layers;
based on the plurality of precedence relationships, generating a sequence of the plurality of neural network layers and a sequence of the plurality of logical cores;
identifying a set of identical logical cores from the plurality of logical cores, wherein the identical logical cores correspond to identical layers, wherein the identical layers are associated with identical parameter tensors and identical weight tensors;
mapping the plurality of logical cores onto an array of neural cores such that the identical logical cores are mapped onto a same neural core, wherein the mapping of the plurality of logical cores on the array of neural cores comprises:
determining a plurality of sequence numbers, each sequence number of the plurality of sequence numbers corresponding to one neural core of the array of neural cores,
mapping the associated parameter tensor, weight tensor, input tensor, and output tensor of each of the plurality of neural network layers onto the array of neural cores, and
determining a schedule for delivery of the weight tensor, the input tensor, and the output tensor of each of the plurality of neural network layers in accordance with the plurality of sequence numbers, the data delivery being at each of the plurality of neural cores for computation of each neural network layer of the plurality of neural network layers;

generating microcode; and
distributing the microcode to the chip, wherein:
   the chip is adapted to execute the microcode to compute the plurality of neural network layers.

\* \* \* \* \*